United States Patent
Nakai

(10) Patent No.: US 10,382,646 B2
(45) Date of Patent: Aug. 13, 2019

(54) IMAGE PROCESSING APPARATUS ADAPTABLE TO PLURALITY OF SPECIFICATIONS OF COMMUNICATIONS PROTOCOL, CONTROL METHOD OF IMAGE PROCESSING APPARATUS, AND STORAGE MEDIUM

(71) Applicant: CANON KABUSHIKI KAISHA, Tokyo (JP)

(72) Inventor: Hironobu Nakai, Komae (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/660,723

(22) Filed: Mar. 17, 2015

(65) Prior Publication Data

US 2015/0271359 A1 Sep. 24, 2015

(30) Foreign Application Priority Data

Mar. 19, 2014 (JP) .................................. 2014-056050

(51) Int. Cl.
  *G06F 3/12* (2006.01)
  *G06F 15/177* (2006.01)
  *H04N 1/32* (2006.01)
(52) U.S. Cl.
  CPC ..... *H04N 1/32625* (2013.01); *H04N 1/32662* (2013.01); *H04N 1/32694* (2013.01)
(58) Field of Classification Search
  CPC ............. H04L 41/0213; H04L 41/0853; H04L 41/0856; H04L 41/22; H04L 41/0226;
  (Continued)

(56) References Cited

U.S. PATENT DOCUMENTS 6,289,023 B1 * 9/2001 Dowling ............... H04L 1/0057
370/419
6,587,971 B1 * 7/2003 Kai ....................... G06F 3/1204
714/47.3

(Continued)

FOREIGN PATENT DOCUMENTS

JP 2886150 B2 4/1999

OTHER PUBLICATIONS

Waldbusser & Grillo, Mar. 2000 (Last Updated Mar. 2, 2013), Host Resources MIB, pp. 1-29 https://datatracker.ietf.org/doc/rfc2790/?include_text=1 (Year: 2000).*

*Primary Examiner* — Benny Q Tieu
*Assistant Examiner* — Juan M Guillermety
(74) *Attorney, Agent, or Firm* — Canon U.S.A., Inc. IP Division

(57) ABSTRACT

An image processing apparatus receives, via a user interface setting screen, a designation to determine a specification of RFC used to return a value indicating a status of the image processing apparatus in response to a request from a host. A control unit of the image processing apparatus returns the value indicating the status conforming to a specification determined according to the designation in response to a request issued at the predetermined time interval from the host. The control unit further returns the value indicating the status conforming to a specification determined according to the designation in response to a request issued at a time interval shorter than the predetermined time interval from the host in a case where it is determined by the host that the former returned value indicates an abnormal state of the image processing apparatus.

16 Claims, 15 Drawing Sheets

(58) Field of Classification Search
CPC .... G06F 3/1204; G06F 3/1229; G06F 3/1232;
G06F 3/1234; G06F 3/1285; H04N
1/32539; H04N 1/32507; H04N 1/32625;
H04N 1/00042; H04N 1/0005; H04N
1/00055; H04N 1/00061; H04N 1/00079;
H04N 1/00204; H04N 1/32117; H04N
1/32662; H04N 1/32694; H04N 1/004;
H04N 1/00411
USPC .............................................. 358/1.13–1.16
See application file for complete search history.

(56) References Cited

U.S. PATENT DOCUMENTS

| | | | | |
|---|---|---|---|---|
| 7,412,701 B1* | 8/2008 | Mitra | ................... | G06F 9/45504 709/223 |
| 8,166,403 B2* | 4/2012 | Torii | ................... | H04L 41/0213 709/222 |
| 2002/0152292 A1* | 10/2002 | Motoyama | .......... | H04L 41/0213 709/223 |
| 2004/0095598 A1* | 5/2004 | Snell | ................... | H04N 1/00204 358/1.15 |
| 2004/0131064 A1* | 7/2004 | Burwell | .............. | H04L 12/4608 370/397 |
| 2005/0018242 A1* | 1/2005 | Azami | ................ | H04N 1/32694 358/1.15 |
| 2005/0157654 A1* | 7/2005 | Farrell | ................... | H04L 41/046 709/224 |
| 2006/0015587 A1* | 1/2006 | Bose | ................... | H04L 41/0213 709/220 |
| 2006/0187481 A1* | 8/2006 | Hayakawa | ............ | G06F 3/1204 358/1.15 |
| 2006/0190496 A1* | 8/2006 | Tsunoda | ............. | H04N 1/00477 |
| 2006/0279775 A1* | 12/2006 | Matsumoto | ........... | G06F 3/1204 358/1.15 |
| 2008/0304095 A1* | 12/2008 | Saito | .................... | G06K 15/005 358/1.14 |
| 2009/0113035 A1* | 4/2009 | Ohashi | ................ | H04L 41/0213 709/223 |
| 2009/0204697 A1* | 8/2009 | Jaladanki | ............. | E04H 17/1417 709/223 |
| 2010/0020354 A1* | 1/2010 | Ito | ...................... | G03G 15/6508 358/1.15 |
| 2012/0140928 A1* | 6/2012 | Messerges | .............. | H04L 63/06 380/277 |
| 2012/0154847 A1* | 6/2012 | Ono | ..................... | G06F 3/1285 358/1.14 |
| 2012/0197929 A1* | 8/2012 | Williams | ................ | G06F 9/445 707/769 |
| 2012/0212757 A1* | 8/2012 | Gaertner | ............... | G06F 3/1206 358/1.13 |
| 2013/0027727 A1* | 1/2013 | Nakai | ................. | H04L 41/0853 358/1.13 |

\* cited by examiner

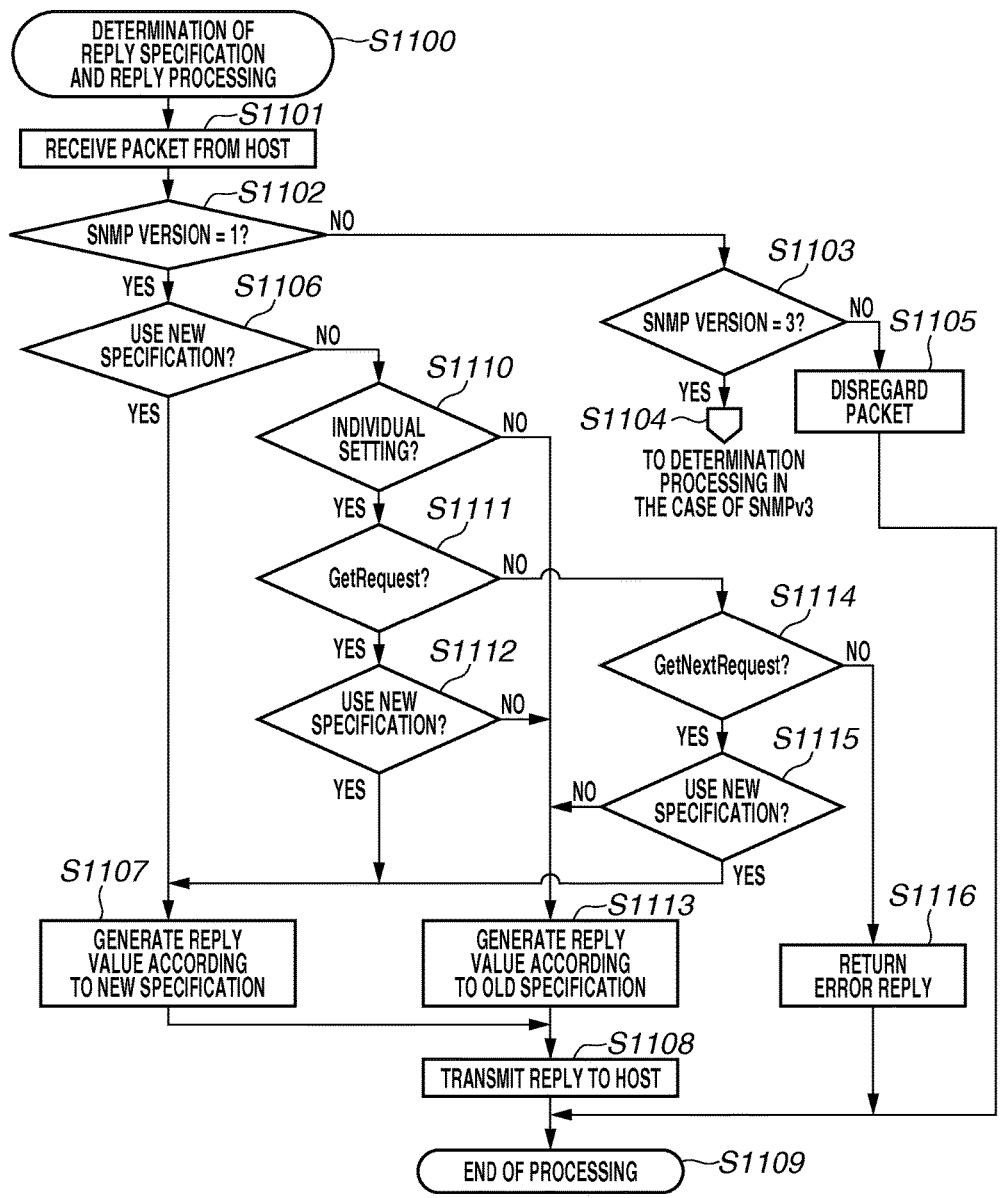

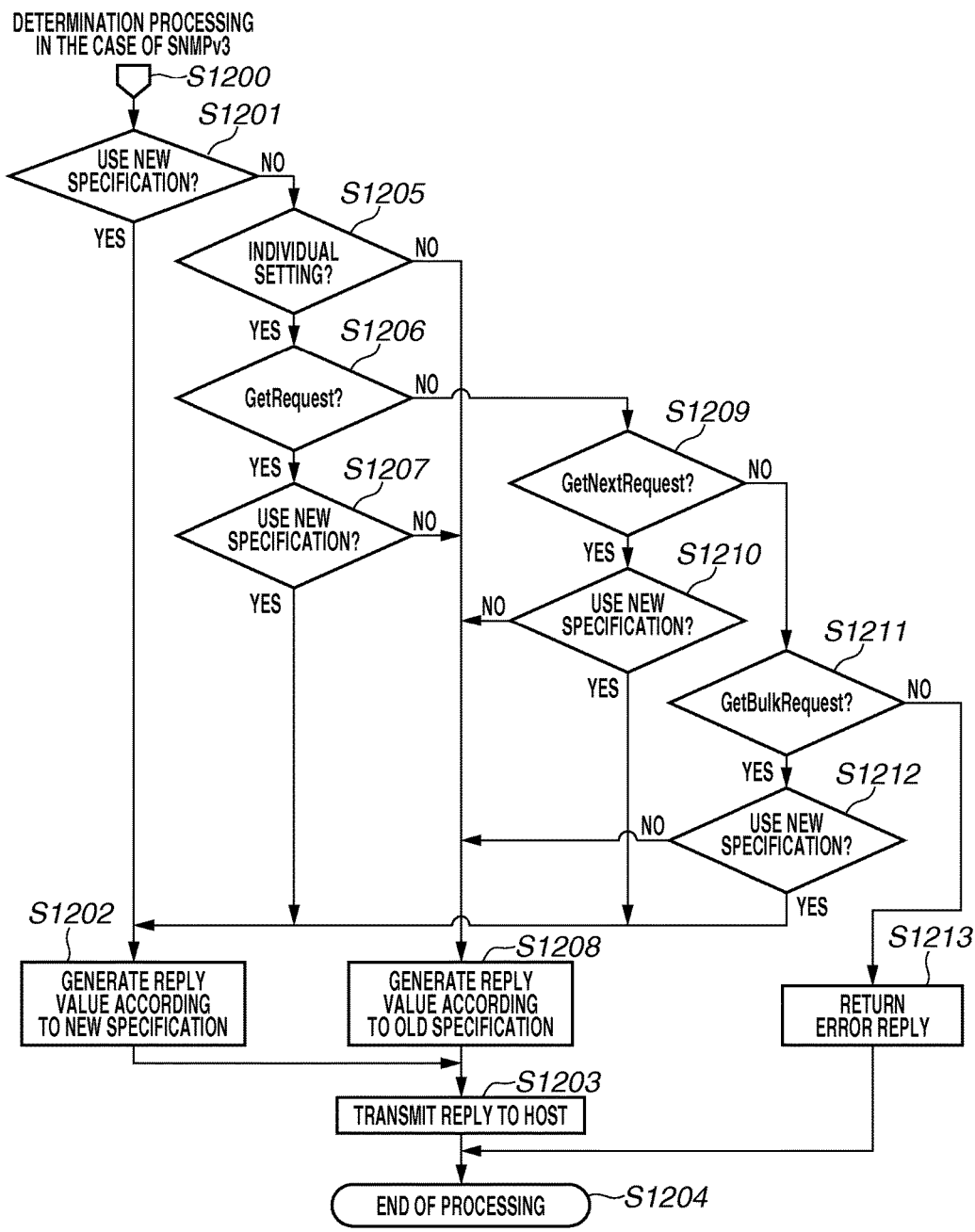

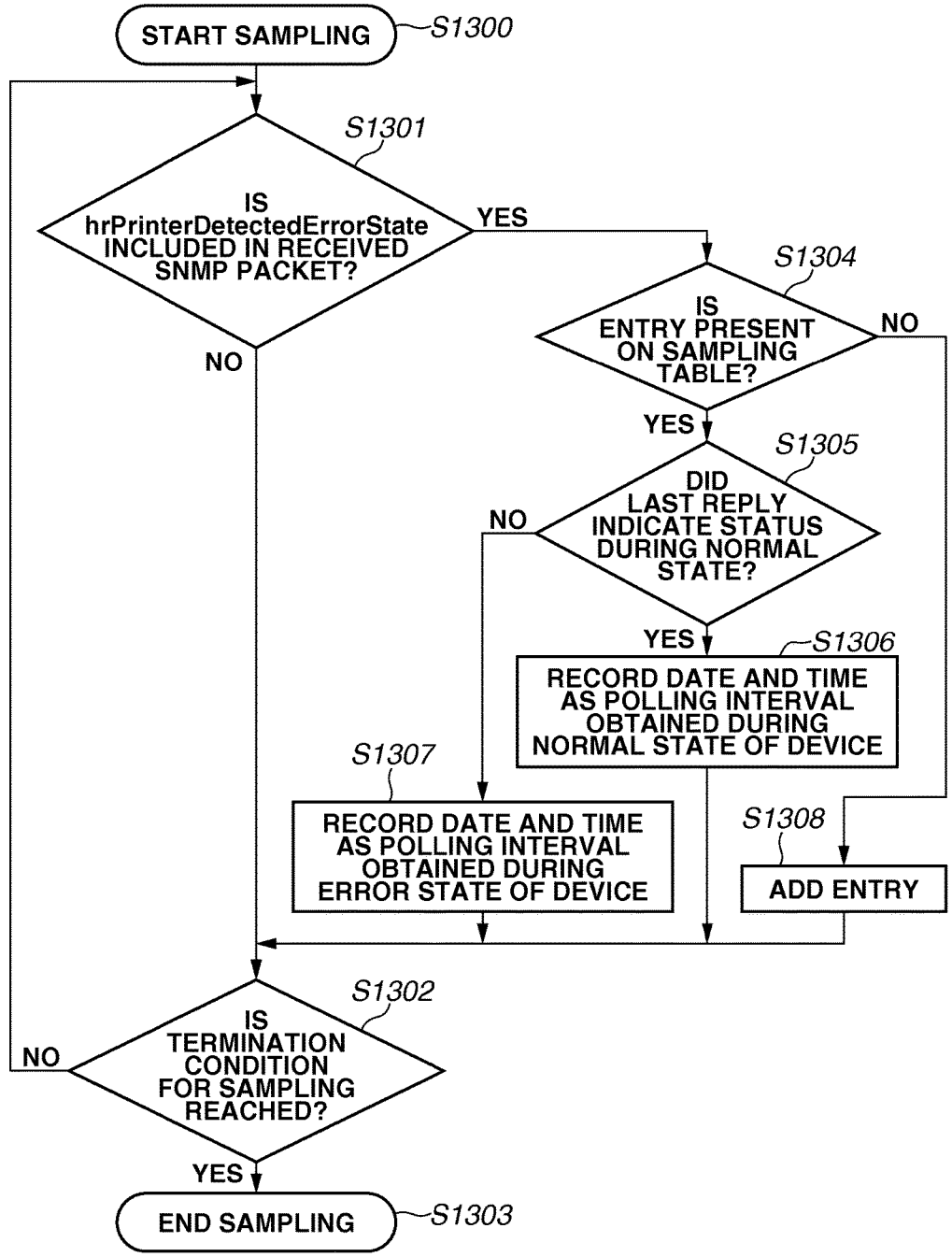

FIG.14

| IP ADDRESS (ENTRY) 1400 | ORDINAL NUMBER IN THE NUMBER OF TIMES 1401 | WHEN LAST REPLY INDICATES STATUS OBTAINED DURING NORMAL STATE 1402 | WHEN LAST REPLY INDICATES STATUS OBTAINED DURING ERROR STATE 1403 |
|---|---|---|---|
| 192.168.100.201 (1404) | 1st | TIME OF LAST REPLY: 19:30:20<br>TIME OF CURRENT INQUIRY: 19:40:20 | TIME OF LAST REPLY: 10:30:20<br>TIME OF CURRENT INQUIRY: 10:30:50 |
| | 2nd | TIME OF LAST REPLY: 19:40:20<br>TIME OF CURRENT INQUIRY: 19:50:20 | TIME OF LAST REPLY: 10:30:50<br>TIME OF CURRENT INQUIRY: 10:31:20 |
| | 3rd | TIME OF LAST REPLY: 19:50:20<br>TIME OF CURRENT INQUIRY: 20:00:20 | NOT YET |
| 192.168.100.202 (1405) | 1st | TIME OF LAST REPLY: 12:40:35<br>TIME OF CURRENT INQUIRY: 12:50:34 | TIME OF LAST REPLY: 11:12:45<br>TIME OF CURRENT INQUIRY: 11:22:45 |
| | 2nd | TIME OF LAST REPLY: 12:50:34<br>TIME OF CURRENT INQUIRY: 13:00:35 | TIME OF LAST REPLY: 11:22:45<br>TIME OF CURRENT INQUIRY: 11:32:46 |
| | 3rd | TIME OF LAST REPLY: 13:00:35<br>TIME OF CURRENT INQUIRY: 13:10:36 | NOT YET |

1406

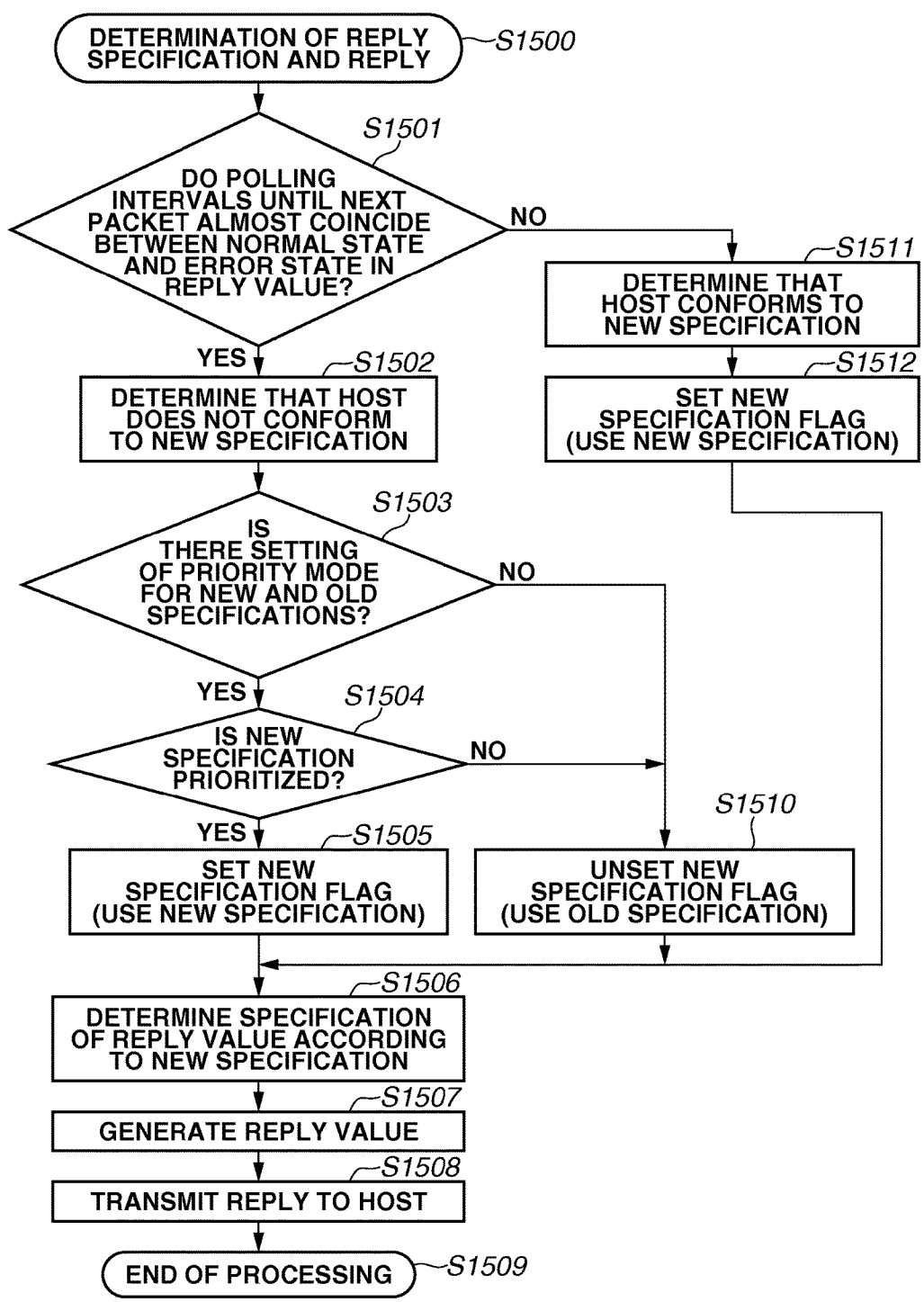

IMAGE PROCESSING APPARATUS ADAPTABLE TO PLURALITY OF SPECIFICATIONS OF COMMUNICATIONS PROTOCOL, CONTROL METHOD OF IMAGE PROCESSING APPARATUS, AND STORAGE MEDIUM

BACKGROUND OF THE INVENTION

Field of the Invention

The present invention relates to a technique of returning a value indicating a status or the like in response to a request from a host that performs status monitoring.

Description of the Related Art

Conventional status monitoring methods for an image processing apparatus connected to a network include a monitoring technique to acquire status information from an image processing apparatus using periodic polling monitoring by a monitoring application that runs on an information processing apparatus serving as a host. The monitoring technique includes an easy monitoring method for monitoring an image processing apparatus using Simple Network Management Protocol (SNMP) and Management Information Base (MIB) information. For example, the monitoring application performs status monitoring by accessing a specific MIB object included in the image processing apparatus to acquire an MIB value.

Examples of the MIB object, which is acquired by the monitoring application, include the following status objects, which are standardized based on the Host Resources MIB in the Request for Comments (RFC):

(1) hrDeviceStatus
(2) hrPrinterStatus
(3) hrPrinterDetectedErrorState

Meanings of values acquirable by the above-mentioned MIB object are standardized by the RFC.

The monitoring application analyzes values of the MIB object acquired from an image forming apparatus with the MIB object used alone or in combination with other objects, thus performing status monitoring of the image forming apparatus (for example, see Japanese Patent No. 2886150).

However, the RFC specification is being updated with the advancement of technology. For example, values of the above-mentioned object hrPrinterDetectedErrorState were defined by RFC 1514 and, after that, the specification thereof was extended by RFC 2790. Therefore, a monitoring application that does not follow the specification extended by RFC 2790 is not able to correctly analyze values acquired from an image processing apparatus, and, as a result, is not able to correctly determine the status of the image processing apparatus.

For example, in the case of a monitoring mechanism that is incorporated as a part of a host operating system (OS) and is, therefore, not able to be altered, the monitoring mechanism cannot cope with the above-described change of the RFC specification and cannot correctly grasp the status of the image processing apparatus.

For example, in the case of a Windows (registered trademark) OS, the status of a device can be determined by polling values of the object hrPrinterDetectedErrorState included in the Host Resources MIB in the RFC using SNMP/MIB. The object hrPrinterDetectedErrorState was defined by RFC 1514 and, after that, the specification thereof was extended by RFC 2790. Windows XP/VISTA, which do not follow the extended specification, cannot correctly interpret the values returned by the extended specification and thus cannot correctly acquire the device status in some cases. For example, although Windows 8 is able to determine "out of paper", Vista and XP may erroneously regard such a value as "off line" and "ready", respectively.

SUMMARY OF THE INVENTION

The present invention is directed to a system for enabling a value indicating a status that an image processing apparatus returns in response to a request from an information processing apparatus to be followed according to a specification associated with the definition of the value indicating a status in the information processing apparatus, thus preventing the occurrence of such a condition that the status of the image processing apparatus is erroneously determined by the information processing apparatus.

According to an aspect of the present invention, an image processing apparatus, which returns a value indicating a status of the image processing apparatus in response to a request issued at a predetermined time interval from an external information processing apparatus, includes a designation unit configured to make a designation to determine which one of a plurality of specifications is to be selected as a specification associated with a definition of the value indicating the status, a first return unit configured to return the value indicating the status conforming to a specification determined according to the designation in response to a request issued at the predetermined time interval from the information processing apparatus, and a second return unit configured to return the value indicating the status conforming to a specification determined according to the designation in response to a request issued at a time interval shorter than the predetermined time interval from the information processing apparatus in a case where it is determined by the information processing apparatus that the value returned by the first return unit indicates an abnormal state of the image processing apparatus.

Further features of the present invention will become apparent from the following description of exemplary embodiments with reference to the attached drawings.

BRIEF DESCRIPTION OF THE DRAWINGS

FIG. 11 is a flowchart illustrating an example of a flow of specification switching processing according to the third exemplary embodiment.

FIG. 12 is a flowchart illustrating an example of a flow of specification switching processing according to the third exemplary embodiment.

FIG. 13 is a flowchart illustrating an example of a flow of sampling processing according to a fourth exemplary embodiment.

FIG. 14 illustrates a sampling table according to the fourth exemplary embodiment.

FIG. 15 is a flowchart illustrating an example of a flow of specification switching processing according to the fourth exemplary embodiment.

DESCRIPTION OF THE EMBODIMENTS

Various exemplary embodiments, features, and aspects of the invention will be described in detail below with reference to the drawings.

<Configuration of Image Processing Apparatus>

According to the exemplary embodiments of the present invention, a multifunction peripheral (MFP), which has a plurality of functions, such as a copying function and a printer function, is described as an example of an image processing apparatus. However, the image processing apparatus according to the exemplary embodiments is not restrictive, but may be a single function peripheral (SFP), which has a single function, such as a copying function or a printer function. In addition, the image processing apparatus includes a monitoring network camera and medical equipment capable of processing a digital image.

First, an example of a configuration of the image processing apparatus 100 is described with reference to FIG. 1.

Figure 1:
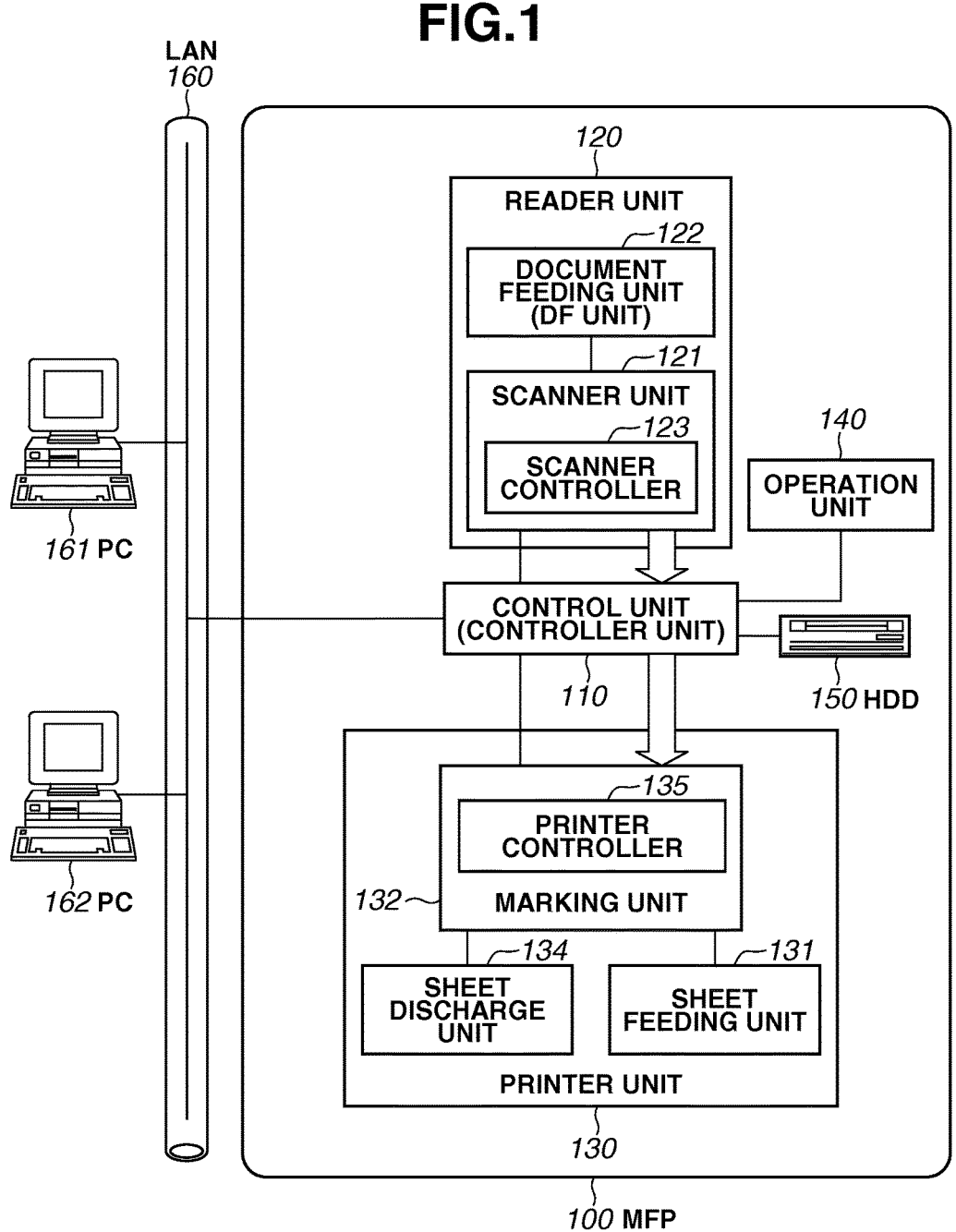
FIG. 1 illustrates an example of a system including an image processing apparatus according to an exemplary embodiment of the present invention.

FIG. 1 illustrates an example of a system including the image processing apparatus (MFP) 100 according to an exemplary embodiment of the present invention.

A control unit (controller unit) 110 is electrically connected to a reader unit 120 and a printer unit 130. The control unit 110 receives data from the reader unit 120 and the printer unit 130. In addition, the control unit 110 transmits various commands to the reader unit 120 and the printer unit 130. Furthermore, the control unit 110 is connected to hosts 161 and 162 via a network (local area network (LAN)) 160, and receives image data or control commands from the hosts 161 and 162.

The network 160 is structured based on, for example, the Ethernet standards. The hosts 161 and 162 are external information processing apparatuses that monitor device configuration information or current status information on the image processing apparatus 100 via the network 160. The network 160 may be an intranet or the Internet.

The reader unit 120 optically reads the image of a document and converts the image into image data. The reader unit 120 includes a scanner unit 121, which has a function of reading a document, and a document feeding unit (DF unit) 122, which conveys a document up to a position where the scanner unit 121 can read the document. A scanner controller 123, which is included in the scanner unit 121, controls the scanner unit 121 and the document feeding unit 122 based on instructions from the control unit 110.

The printer unit 130 includes a sheet feeding unit 131, which stores sheets (paper or recording material) to be used for image formation (printing), a marking unit 132, which includes a printer controller 135 and transfers and fixes image data to a sheet, and a sheet discharge unit 134, to which the printed sheet is discharged. The printer unit 130, based on an instruction from the control unit 110, feeds a sheet from the sheet feeding unit 131 to the marking unit 132, prints image data on the sheet at the marking unit 132, and then discharges the sheet to the sheet discharge unit 134. The sheet discharge unit 134 can perform processing, such as sorting or stapling, on sheets subjected to printing by the marking unit 132. The sheet feeding unit 131 includes a plurality of sheet feeding sections, in each of which sheets are stored and stacked (set). Each sheet feeding section can store, for example, a plurality of types of sheets, such as plain paper and glossy paper. In addition, each sheet feeding section can store again the sheets subjected to printing by the printer unit 130 of the image processing apparatus 100. Examples of each sheet feeding section include a sheet feeding cassette, a sheet feeding deck, and a manual feed sheet tray. The form of each sheet feeding section is not restrictive, and may be the one capable of conveying sheets stored therein to the marking unit 132.

An operation unit 140, which includes, for example, hardware keys, a liquid crystal display portion, and a touch-panel portion attached on the surface thereof, receives an instruction from a user via those members. In addition, the operation unit 140 can display software keys and functions and statuses of the image processing apparatus 100 on the liquid crystal display portion. The operation unit 140 transmits, to the control unit 110, a command corresponding to an instruction from the user. A hard disk drive (HDD) 150 stores various settings of the image processing apparatus 100 and image data. Furthermore, the image processing apparatus 100 may include another storage device, such as a solid-state drive (SSD), instead of the HDD 150.

With the above-described configuration, the image processing apparatus 100 implements various functions, such as a copying function, an image data transmitting function, and a printer function. To implement the copying function, the control unit 110 performs control to cause the reader unit 120 to read the image of a document and to cause the printer unit 130 to print the image data on a sheet. To implement the image data transmitting function, the control unit 110 converts the image data of a document read by the reader unit 120 into code data and transmits the code data to the host 161 or 162 via the network 160. Moreover, to implement the printer function, the control unit 110 converts code data (print data) received from the host 161 or 162 via the network 160 into image data and transmits the image data to the printer unit 130. The printer unit 130 then prints the received image data on a sheet.

The control unit 110 includes a central processing unit (CPU), a read-only memory (ROM), a random access memory (RAM), and a network interface (I/F), which are not illustrated. The control unit 110 implements the above-described various control operations with the CPU executing programs stored in the ROM and the HDD 150.

<Description of Standard Technique>

Next, a description is made about a technique to acquire information from a network device based on the Request for Comments (RFC) issued by the Internet Engineering Task Force (IETF) with the aim of standardizing techniques to be used on the Internet.

Simple Network Management Protocol (SNMP) is generally and widely used as a protocol for monitoring information about devices on networks. Network devices to be managed with SNMP are provided with Management Information Base (MIB) information, and are managed by making a response in response to an SNMP request from a management terminal. The structure of MIB information was also standardized by the IETF.

MIB information is hierarchical (tree-structured) on a field-by-field basis, and branches are assigned respective numbers. Information obtained by joining the numbers is called an object identifier (OID). In the MIB information, the hierarchical structure, information indicating what information an object having an OID has, and information indicating by what data type the object is defined are specified. MIBs include ones defined by various RFCs and ones defined by private information uniquely extended by the respective companies. The definition of data type is also specified by RFC as a management information structure (Structure of Management Information (SMI)), and is expressed by a description language specified by the International Organization for Standardization (ISO) and the ITU Telecommunication Standardization Sector (ITU-T), which is called "Abstract Syntax Notation One (ASN.1)".

In addition, RFC technical specifications are not unvarying, and are to be updated with the advancement of technology. RFCs are assigned numbers, such as "RFC xxxx". In updating the once-published specification, the old number is set obsolete and a new number is assigned.

In some cases, a Host Resources MIB is used so as to enable a remote host on a network to monitor the status of a network device using the SNMP and the MIB. In addition, the Host Resources MIB includes the one specified by RFC 1514 and the one specified by updated RFC 2790, and essentially has upward compatible extended specifications.

However, there are specifications that are partially incompatible between RFC 1514 and updated RFC 2790. The following describes such specifications and how such specification incompatibility affects monitoring of a status of an image processing apparatus connected to a network, with reference to FIGS. 2A and 2B.

<Description of Specification Incompatibility>

First, MIB information of specification incompatibility which becomes problematic between RFC 1514 and RFC 2790 is described.

In the description concerning "hrPrinterDetectedErrorState OBJECT-TYPE" in each specification, the data type is a binary string of the octet type, and the definition of RFC 2790 appears to have been updated in such a way as to implement upward compatibility in binary bit assignment. However, in a case where a binary conversion rule in the above-mentioned description language ASN.1 is used and data is viewed as a numerical value in the byte order on a network, there occur differences as illustrated in FIGS. 2A and 2B.

Figure 2:
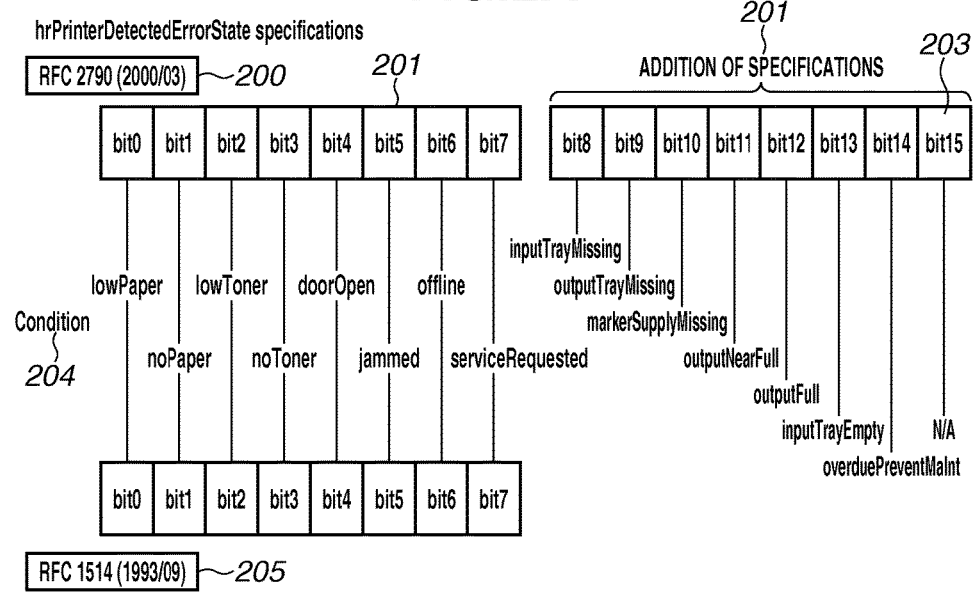
FIGS. 2A and 2B illustrate differences in specification between RFC 1514 and RFC 2790.

FIGS. 2A and 2B illustrate differences in specification in the object hrPrinterDetectedErrorState of the Host Resources MIB.

Referring to FIG. 2A, reference numeral 200 denotes a bit assignment conforming to RFC 2790 published in March 2000. Reference numeral 204 denotes a status of the printer when each bit is set (=Condition). Reference numeral 205 denotes a bit assignment conforming to RFC 1514 published in September 1993. Reference numeral 201 denotes assignments in which each condition is compatible as the bit assignment between RFC 1514 and RFC 2790. On the other hand, reference numeral 202 denotes addition of specifications, in which new Conditions and new bit assignments are added. Reference numeral 203 denotes a bit to which no Condition is assigned.

As mentioned in the foregoing, as long as the bit assignment is viewed, the object hrPrinterDetectedErrorState in RFC 2790 appears to be compatible with that in RFC 1514.

FIG. 2B illustrates a table obtained by associating numerical values in the byte order on a network for each Condition using the binary conversion rule in the description language ASN.1.

Referring to FIG. 2B, reference numeral 206 denotes Condition, reference numeral 207 denotes numerical values in hexadecimal in RFC 2790, and reference numeral 208 denotes numerical values in hexadecimal in RFC 1514. The object hrPrinterDetectedErrorState is data of one byte (eight bits) in RFC 1514, while it is data of two bytes (sixteen bits) in RFC 2790. Statuses denoted by reference numeral 210, which were added at the time of addition of specifications in RFC 2790, cannot be indicated in RFC 1514, which is an old specification. When the object hrPrinterDetectedErrorState is viewed as numerical values, it is understood that only a condition "idle" denoted by reference numeral 209 is coincident between RFC 1514, which is an old specification, and RFC 2790, which is a new specification, and the other conditions are not coincident therebetween.

<Status Monitoring of Image Processing Apparatus by Host>

Examples of status monitoring of the image processing apparatus performed by the host are described with reference to FIGS. 3 to 5.

Figure 3:
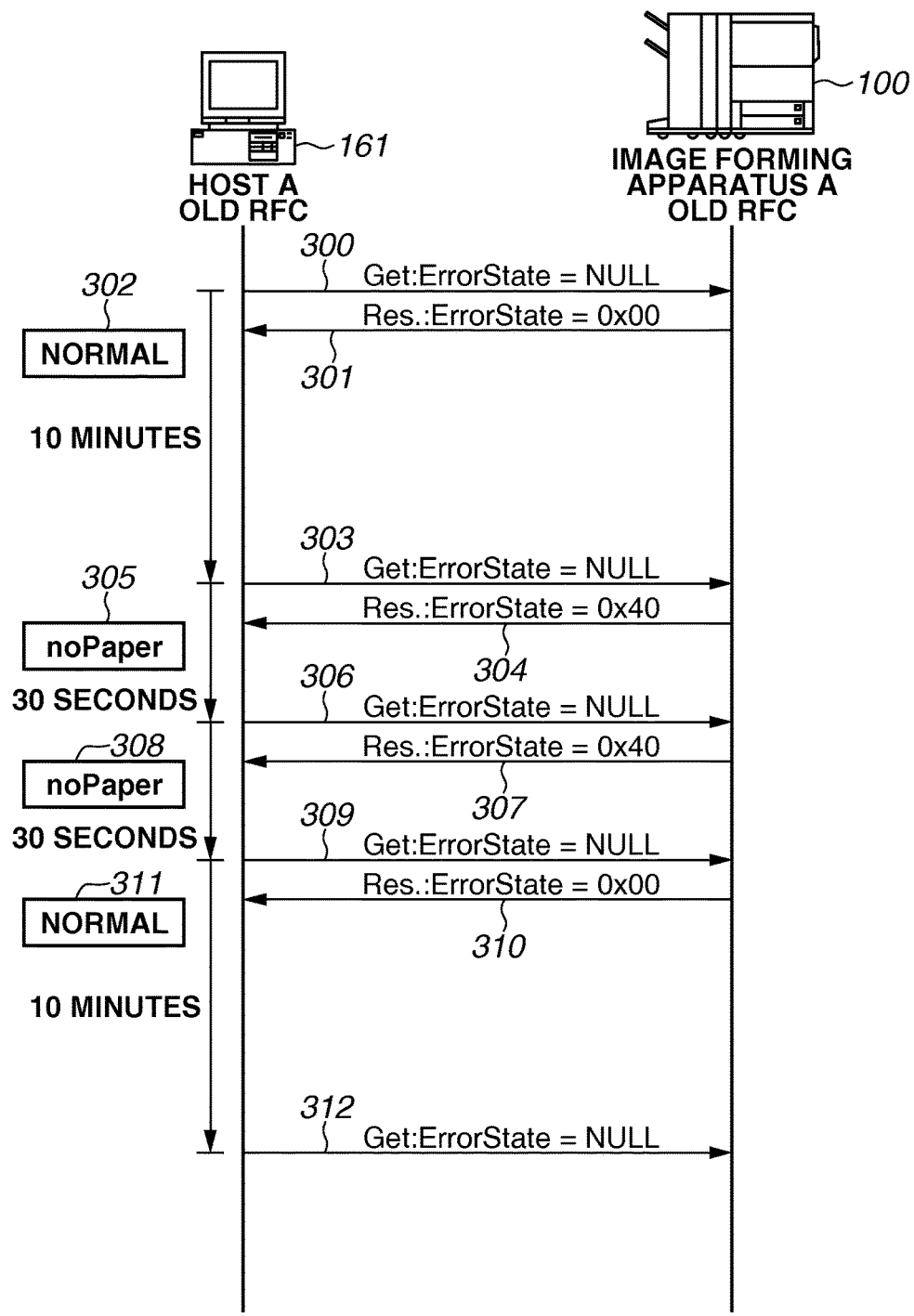
FIG. 3 is a sequence diagram illustrating status monitoring of the image processing apparatus performed by a first host.
Figure 4:
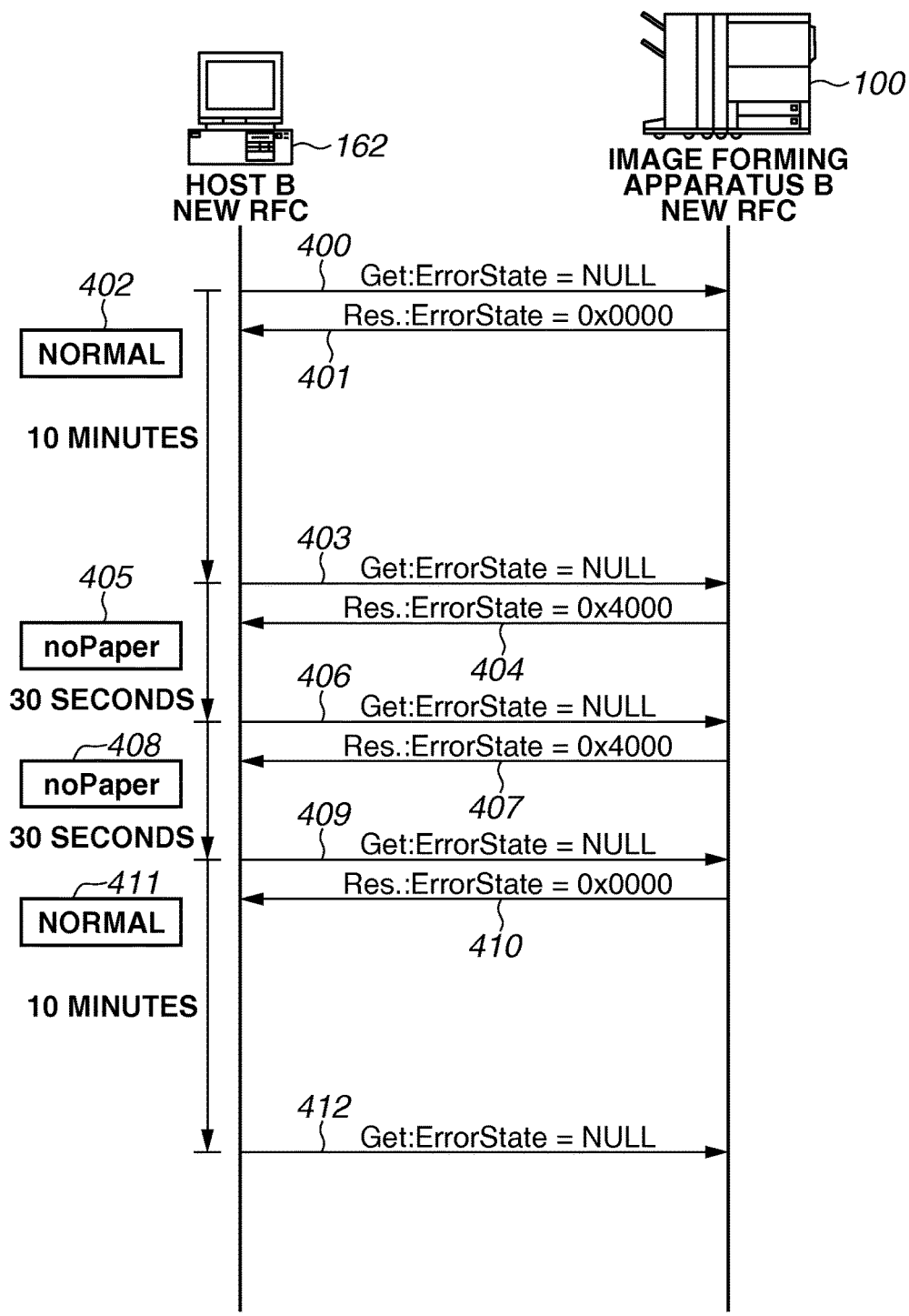
FIG. 4 is a sequence diagram illustrating status monitoring of the image processing apparatus performed by a second host.
Figure 5:
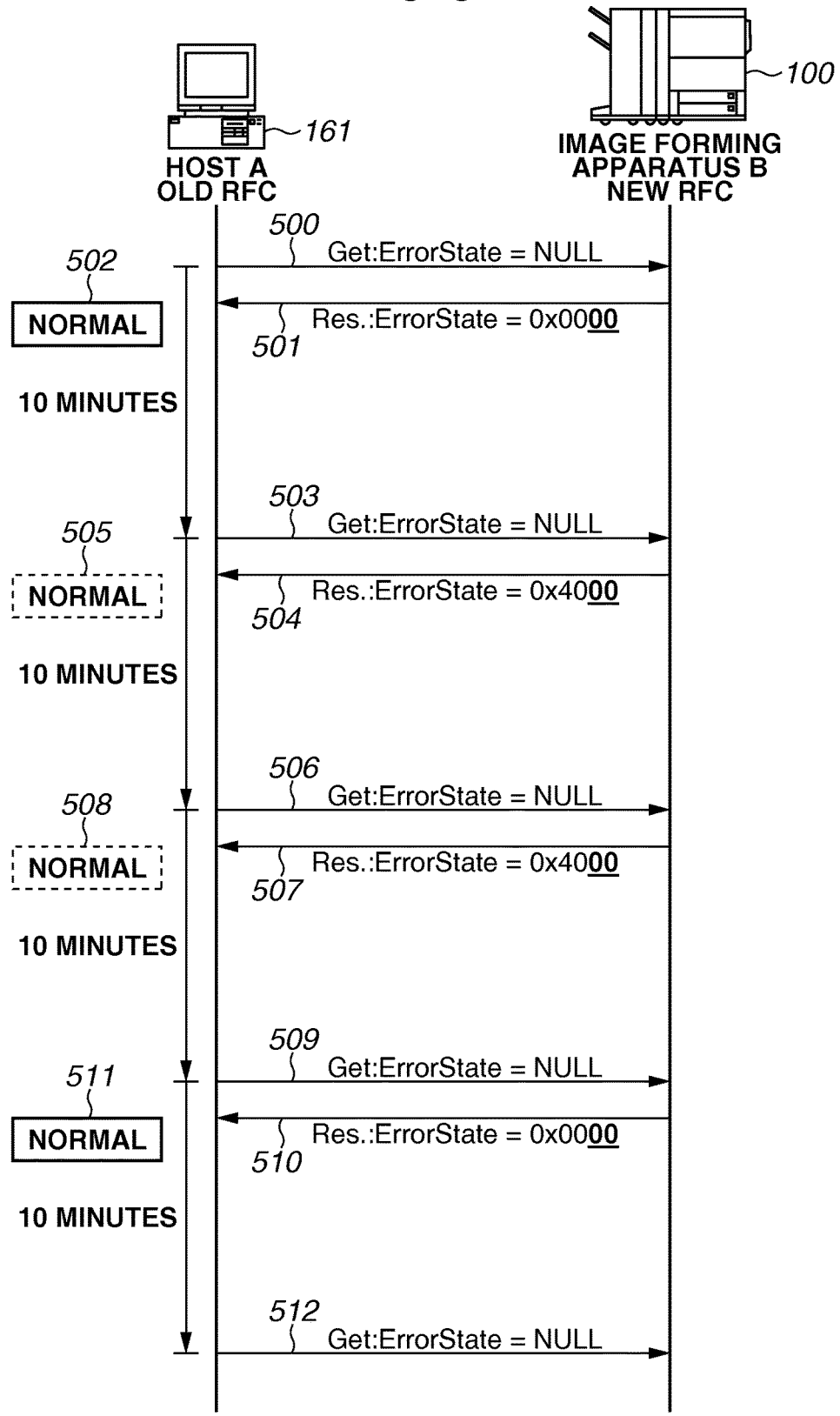
FIG. 5 is a sequence diagram illustrating status monitoring of the image processing apparatus performed by the first host.

FIGS. 3 to 5 are sequence diagrams each illustrating status monitoring of the image processing apparatus performed by the host.

First, an example of status monitoring conforming to an old RFC is described with reference to FIG. 3.

Referring to FIG. 3, a host A (161) is a host conforming to RFC 1514 (hereinafter referred to as an "old RFC"), and an image processing apparatus A (100) is an image processing apparatus conforming to the old RFC. Thus, FIG. 3 illustrates an example of status monitoring performed by a combination of the host A (161), which performs status monitoring according to the old RFC, and the image processing apparatus A (100), which performs status notification according to the old RFC.

In step 300, to perform status acquisition of the image processing apparatus A (100), the host A (161) transmits, to the image processing apparatus A (100), an acquisition request for the object hrPrinterDetectedErrorState using a GetRequest operation in SNMP. Since an OID value included in a GetRequest is a null in the specification of SNMP, the image processing apparatus A (100), which is a receiving side, cannot determine whether the transmitting-side host conforms to the old or new RFC, based on a packet (300) of GetRequest transmitted from the host A (161).

In step 301, the image processing apparatus A (100) makes a response with a value obtained by performing, on the current device status, status mapping conforming to the old RFC. If the reply value of the response (301) is "0x00", which indicates a condition of "idle" as illustrated in FIG. 2B, then in step 302, the host A (161) recognizes that the status of the image processing apparatus A (100) is normal.

To avoid extra network traffic with respect to a device recognized as normal, in step 303, the host A (161), which has recognized that the image processing apparatus A (100) is in a normal state, next performs updating of the status monitoring of the image processing apparatus A (100) after the elapse of a predetermined time interval (in this instance, after 10 minutes). If the control unit 110 in the image processing apparatus A (100) determines that the sheet feeding unit 131 is in an out-of-paper state, then in step 304, the image processing apparatus A (100) makes a reply with a value of "0x40" as the current device status in response to the request from the host A (161).

When the reply value in step 304 is "0x40", which indicates "noPaper" in the status mapping conforming to the old RFC as illustrated in FIG. 2B, in step 305, the host A (161) recognizes that the status of the image processing apparatus A (100) is out of paper (noPaper). To confirm the restoration from an error state, in step 306, the host A (161), which has recognized that the status of the image processing apparatus A (100) is out of paper (noPaper), repeats the status acquisition of the image processing apparatus A (100) at a time interval shorter than the above predetermined time interval (in this instance, at an interval of 30 seconds) until the restoration from an error state. If the status of the image processing apparatus A (100) does not change even after 30 seconds, then in step 307, the image processing apparatus A (100) makes a response with a reply value of "0x40" indicating that the out-of-paper state is continuing. In step 308, the host A (161) determines that the out-of-paper state is continuing, and in step 309, the host A (161) performs status acquisition of the image processing apparatus A (100) again after 30 seconds.

At this time, when the sheet feeding unit 131 of the image processing apparatus A (100) has been replenished with sheets, the control unit 110 determines that the out-of-paper state has been removed, and then in step 310, the image processing apparatus A (100) makes a reply with a reply value of "0x00" (idle) in response to the status acquisition request transmitted in step 309. In step 311, the host A (161), which has received the reply transmitted in step 310, determines that the status of the image processing apparatus A (100) has returned to a normal state, and in step 312, the host A (161) performs status acquisition with the interval of the next status acquisition of the image processing apparatus A (100) set to 10 minutes. As described in the foregoing, the host performs periodic adjustment of a polling interval depending on the monitored content. Accordingly, the host can enhance the responsiveness with respect to a restoration of the image processing apparatus from an abnormal-detected state, such as paper jamming, or a status change of the image processing apparatus to a printing-ready state, such as a restoration from warming-up.

Next, an example of status monitoring conforming to the new RFC is described with reference to FIG. 4.

Referring to FIG. 4, a host B (162) is a host conforming to RFC 2790 (hereinafter referred to as a "new RFC"), and an image processing apparatus B (100) is an image processing apparatus conforming to the new RFC, which is different from the image processing apparatus A (100) illustrated in FIG. 3. Thus, FIG. 4 illustrates an example of status monitoring performed by a combination of the host B (162), which performs status monitoring according to the new RFC, and the image processing apparatus B (100), which performs status notification according to the new RFC.

In step 400, to perform status acquisition of the image processing apparatus B (100), the host B (162) transmits, to the image processing apparatus B (100), an acquisition request for the object hrPrinterDetectedErrorState using a GetRequest operation in SNMP. In step 401, the image processing apparatus B (100) makes a response with a value obtained by performing, on the current device status, status mapping conforming to the new RFC. If the reply value of the response (401) is "0x0000", which indicates a condition of "idle" as illustrated in FIG. 2B, then in step 402, the host B (162) recognizes that the status of the image processing apparatus B (100) is normal.

To avoid extra network traffic with respect to a device recognized as normal, in step 403, the host B (162), which has recognized that the image processing apparatus B (100) is in a normal state, next performs updating of the status monitoring of the image processing apparatus B (100) after 10 minutes. If the control unit 110 in the image processing apparatus B (100) determines that the sheet feeding unit 131 is in an out-of-paper state, then in step 404, the image processing apparatus B (100) makes a reply with a value of "0x4000" as the current device status in response to the request from the host B (162).

When the reply value in step 404 is "0x4000", which indicates "noPaper" in the status mapping conforming to the new RFC as illustrated in FIG. 2B, in step 405, the host B (162) recognizes that the status of the image processing apparatus B (100) is out of paper (noPaper). To confirm the restoration from an error state, in step 406, the host B (162), which has recognized that the status of the image processing apparatus B (100) is out of paper (noPaper), repeats the status acquisition of the image processing apparatus B (100) at an interval of 30 seconds until the restoration from an error state. If the status of the image processing apparatus B (100) does not change even after 30 seconds, then in step 407, the image processing apparatus B (100) makes a response with a reply value of "0x4000" indicating that the out-of-paper state is continuing. In step 408, the host B (162) determines that the out-of-paper state is continuing, and in step 409, the host B (162) performs status acquisition of the image processing apparatus B (100) again after 30 seconds.

At this time, when the sheet feeding unit 131 of the image processing apparatus B (100) has been replenished with sheets, the control unit 110 determines that the out-of-paper state has been removed, and then in step 410, the image processing apparatus B (100) makes a reply with a reply value of "0x0000" (idle) in response to the status acquisition request transmitted in step 409. In step 411, the host B (162), which has received the reply transmitted in step 410, determines that the status of the image processing apparatus B (100) has returned to a normal state, and in step 412, the host B (162) performs status acquisition with the interval of the next status acquisition of the image processing apparatus B (100) set to 10 minutes.

Finally, an example of status monitoring in a case where an apparatus conforming to the old RFC and an apparatus conforming to the new RFC coexist is described with reference to FIG. 5.

Referring to FIG. 5, a host A (161) is a host conforming to the old RFC 2790, and an image processing apparatus B (100) is an image processing apparatus the settings of which were changed in such a way as to conform to the new RFC relative to the image processing apparatus A (100) illustrated in FIG. 3. Thus, FIG. 5 illustrates an example of status monitoring performed by a combination of the host A (161), which performs status monitoring according to the old RFC, and the image processing apparatus B (100), which performs status notification according to the new RFC.

In step 500, to perform status acquisition of the image processing apparatus B (100), the host A (161) transmits, to the image processing apparatus B (100), an acquisition request for the object hrPrinterDetectedErrorState using a GetRequest operation in SNMP. Since an OID value included in a GetRequest is a null in the specification of SNMP, the image processing apparatus B (100), which is a receiving side, cannot determine whether the transmitting-side host conforms to the old or new RFC, based on a packet (500) of GetRequest transmitted from the host A (161).

In step 501, the image processing apparatus B (100) makes a response with a value obtained by performing, on the current device status, status mapping conforming to the new RFC. If the reply value of the response (501) is "0x0000", it indicates a condition of "idle" as illustrated in FIG. 2B.

On the other hand, in a case where the host A (161), which has received the response (501), supports only the interpretation of the old RFC, the host A (161) can interpret only one octet of the object hrPrinterDetectedErrorState. This is equivalent to that, when the host A (161) receives the response according to the byte order on a network and discards an uninterpretable data portion of the reply value, the host A (161) can interpret only a lower one byte of the hexadecimal number. Thus, only a lower one byte "0x00" among the reply value "0x0000" received from the image processing apparatus B (100) in step 501 can be interpreted by the host A (161). This value "0x00" indicates a condition of "idle" in the status mapping conforming to the old RFC as illustrated in FIG. 2B, then in step 502, the host A (161) recognizes that the status of the image processing apparatus B (100) is normal.

To avoid extra network traffic with respect to a device recognized as normal, in step 503, the host A (161), which has recognized that the image processing apparatus B (100) is in a normal state, next performs updating of the status monitoring of the image processing apparatus B (100) after 10 minutes. If the control unit 110 in the image processing apparatus B (100) determines that the sheet feeding unit 131 is in an out-of-paper state, then in step 504, the image processing apparatus B (100) makes a reply with a value of "0x4000" as the current device status in response to the request from the host A (161). When the reply value in step 504 is "0x4000", this indicates "noPaper" in the status mapping conforming to the new RFC as illustrated in FIG. 2B.

On the other hand, the host A (161), which can make only an interpretation conforming to the old RFC, can interpret only a lower one byte, i.e., "0x00", of the reply value received from the image processing apparatus B (100), as mentioned in the foregoing. The status mapping of "0x00" that the host A (161) recognizes is "idle" according to the old RFC as illustrated in FIG. 2B. Therefore, in step 505, the host A (161) erroneously recognizes an abnormal state "out of paper" received from the image processing apparatus B (100) conforming to the new RFC as a normal "idle state".

Since such a logic works as to avoid extra network traffic with respect to a device recognized as normal, in step 506, the host A (161), which has erroneously recognized the status of the image processing apparatus B (100) as "normal", next performs updating of the status monitoring of the image processing apparatus B (100) after 10 minutes. If, at this time, the out-of-paper state of the image processing apparatus B (100) has not yet been removed, in step 507, the image processing apparatus B (100) makes a reply with the reply value of "0x0400" conforming to the new RFC, similarly to the above-mentioned step 504. Since the host A (161) can make only an interpretation conforming to the old RFC, in step 508, the host A (161) continues erroneously recognizing that the image processing apparatus B (100) is in a "normal state", similarly to the above-mentioned step 505.

The host A (161) also assumes the role of, if an abnormality occurs in the image processing apparatus B (100), transmitting an e-mail notification to a device administrator, preventing a print job from being input to the image processing apparatus B (100), or causing another apparatus in a normal state to perform proxy processing. Therefore, if the host A (161) makes an erroneous recognition as in step 505 or 508, the operation of the whole system may be disturbed.

Since the host A (161) has erroneously recognized that the image processing apparatus B (100) is in a normal state (508), in step 509, the host A (161) performs status acquisition of the image processing apparatus B (100) after 10 minutes. At this time, when the sheet feeding unit 131 of the image processing apparatus B (100) has been replenished with sheets, the control unit 110 determines that the out-of-paper state has been removed, and then in step 510, the image processing apparatus B (100) makes a reply with a reply value of "0x0000" (idle) in response to the status acquisition request transmitted in step 509.

The host A (161) recognizes the reply value as "0x00" according to the old RFC as mentioned in the foregoing. Since the recognized value "0x00" corresponds to a condition of "idle" in the status mapping conforming to the old RFC as illustrated in FIG. 2B, in step 511, the host A (161) recognizes the status of the image processing apparatus B (100) as normal. Therefore, in step 512, the host A (161) next performs status monitoring of the image processing apparatus B (100) at an interval of 10 minutes.

As described above, in a case where status monitoring is performed in a combination of a monitoring application, which performs status monitoring according to the old RFC, and an image processing apparatus, which performs status notification according to the new RFC, the monitoring application cannot correctly grasp the status of the image processing apparatus. Therefore, such a monitoring mechanism that the monitoring application changes the polling interval for status monitoring of the image processing apparatus according to the status of the image processing apparatus (for example, shortens the polling interval during the abnormal state as compared with during the normal state) cannot also correctly operate. As mentioned in the foregoing, suppose that the monitoring application is equipped with a monitoring mechanism which performs polling monitoring at an interval of 10 minutes during the normal state and performs polling monitoring at an interval of 30 minutes during the abnormal state. However, a monitoring application that cannot cope with a change of RFC specifications cannot recognize the abnormal state of the image processing apparatus, thus resulting in the performance of polling monitoring at a constant interval of 10 minutes as illustrated in FIG. 5.

According to exemplary embodiments of the present invention, the use or nonuse of new and old specifications, the generation of a plurality of statuses corresponding to the new and old specifications, and the range of application of the new and old specifications are set on the side of an image processing apparatus, and operations are performed in conformity with such settings. In the following, a setting screen used for such settings is described with reference to FIG. 6, and an operation of the image processing apparatus is described with reference to the flowchart of FIG. 7.

Figure 6:
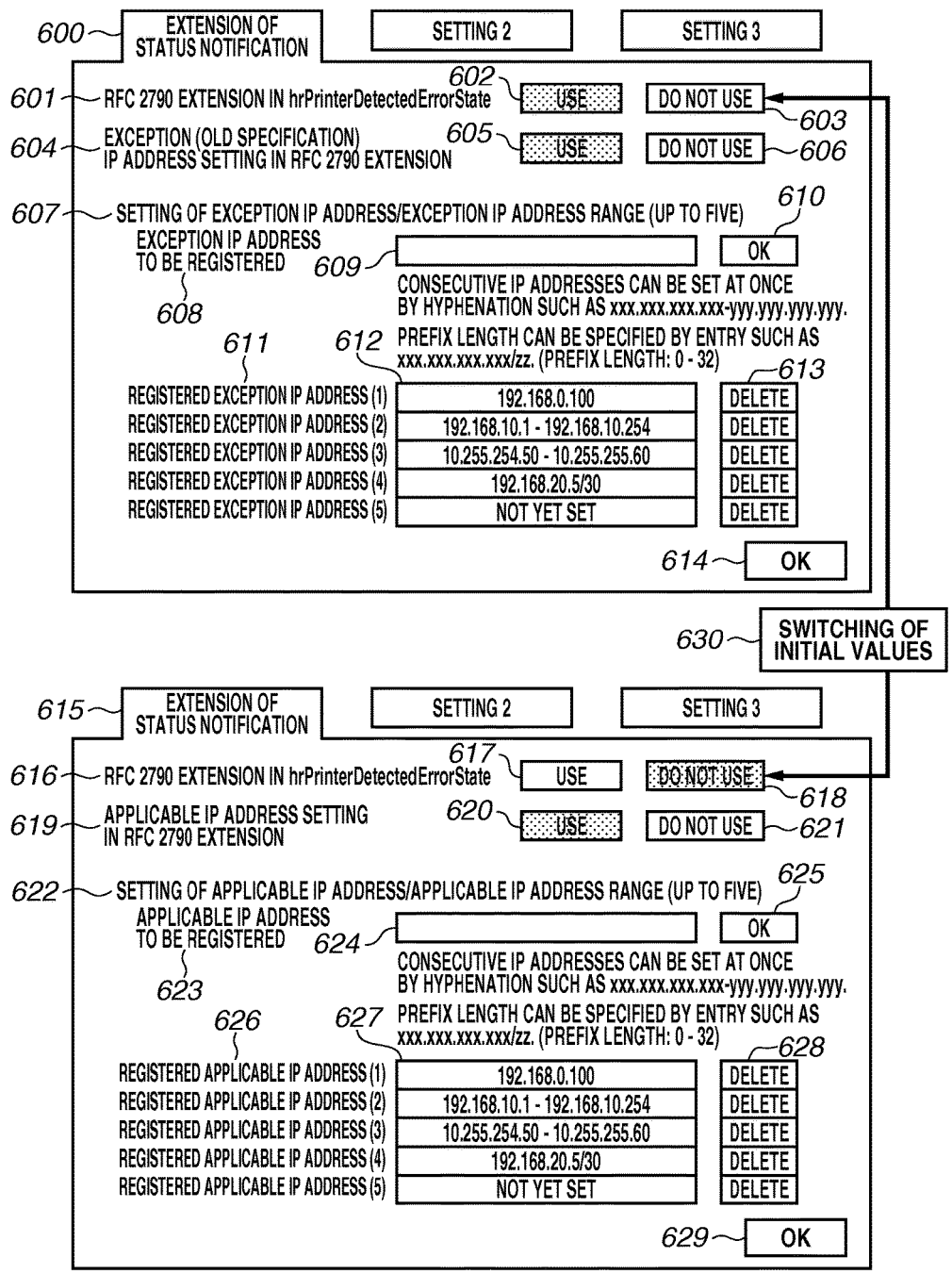
FIG. 6 illustrates examples of user interface (UI) setting screens according to a first exemplary embodiment.

FIG. 6 illustrates examples of user interface (UI) setting screens according to a first exemplary embodiment. Each UI setting screen is displayed on a display screen of the operation unit 140 under the control of the control unit 110 of the image processing apparatus 100. The setting screen illustrated in FIG. 6 is used to make a designation about to which one of a plurality of RFC specifications the RFC specification associated with the definition of values indicating statuses of the image processing apparatus 100 is set. Here, the following description is made using the operation unit 140 of the image processing apparatus 100. However, instead of the operation unit 140, a web browser (not illustrated) on a personal computer (PC) (161 or 162) may be connected to a remote UI function of the image processing apparatus 100 and may be used to perform similar settings.

Referring to FIG. 6, a screen 600, which is a display example, is used to switch new and old specifications. A setting item 601 is used to set the use or nonuse of the extended definitions in bit8 to bit15 in the hrPrinterDetectedErrorState specification extended in RFC 2790 illustrated in FIGS. 2A and 2B. In the present exemplary embodiment, the setting in the setting item 601 is described using a choice between only two things "use" and "do not use". However, in a case where the response specification is further extended, more settable choices may be added, and the display and processing operations of the operation unit 140 may be modified so as to allow the user to perform settings among the two or more choices. If a button "use" 602 is set, the image processing apparatus 100 is set to make a status reply conforming to RFC 2790. If a button "do not use" 603 is set, the image processing apparatus 100 is set to make a status reply conforming to RFC 1514.

Furthermore, a setting item 604 is used to set the use or nonuse of exception setting for making not a reply conforming to the extended specification of RFC 2790 but a reply conforming to the old specification of RFC 1514 with respect to a specified Internet Protocol (IP) address. If a button "use" 605 is selected by the user, the content of such selection is transmitted from the operation unit 140 to the control unit 110, so that setting items 607 to 613 used for setting exception addresses become available for entry. If a button "do not use" 606 is selected by the user, the setting items 607 to 613 used for setting exception addresses are masked and the operation unit 140 does not accept any entry into the setting items 607 to 613.

The setting item 607 is used to perform exception setting using an IP address, and, in the present exemplary embodiment, allows up to five IP addresses to be set. With respect to the item "exception IP address to be registered" 608, the user can perform settings by entering, into the entry field 609, a particular IP address, a range of IP addresses, or a specified prefix length and pressing the "OK" button 610. The content set in the entry field 609 is listed in the item "registered exception IP address" 611, so that each setting content is displayed in the list 612. To change the setting of a registered exception IP address, the user can press the "delete" button 613 to delete the setting and perform exception address setting again.

If there are not any problems with the content displayed in the setting screen 600, the user can press an "OK" button 614 to terminate the setting operation, so that the final setting content is transmitted from the operation unit 140 to the control unit 110. The setting screen 600 is an example of an input screen displayed in the case of, under the premise of using RFC 2790, setting the IP address of a host that involves a reply conforming to the old specification of RFC 1514 as exception setting. If the user presses the button "do not use" 603 in the displayed setting screen 600, switching of initial values 630 is performed, so that the setting screen 600 is switched to a setting screen 615.

In the following, an example of setting content displayed in a case where the button "do not use" 603 is set so as not to use RFC 2790 is described using the setting screen 615. In an example of the setting screen 615, under the premise of using the old specification of RFC 1514, the IP address of a host conforming to the new specification of RFC 2790 is to be set as exception setting.

A setting item 616 is used to set whether to use the extended specification of RFC 2790. In the present exemplary embodiment, the setting in the setting item 616 is described using a choice between only two things "use" and "do not use". However, in a case where the response specification is further extended, more settable choices may be added, and the display and processing operations of the operation unit 140 may be modified so as to allow the user to perform settings among the two or more choices. If a button "use" 617 is set, the image processing apparatus 100 is set to make a status reply conforming to the RFC 2790 specification. If a button "do not use" 618 is set, the image processing apparatus 100 is set to make a status reply conforming to the RFC 1514 specification. Here, if the user presses the button "use" 617, switching of initial values 630 is performed, so that the setting screen 615 is switched to the setting screen 600.

A setting item 619 is used to set whether to use the address setting of a host to which the new specification of RFC 2790 is applicable, contrary to the above-mentioned setting item 604. If a button "use" 620 is selected by the user, the content of such selection is transmitted from the operation unit 140 to the control unit 110, so that setting items 622 to 628 used for setting applicable addresses become available for entry. If a button "do not use" 621 is selected by the user, the setting items 622 to 628 used for setting applicable addresses are masked and the operation unit 140 does not accept any entry into the setting items 622 to 628.

The setting item 622 is used to perform application setting using an IP address, and, in the present exemplary embodiment, allows up to five IP addresses to be set. With respect to the item "applicable IP address to be registered" 623, the user can perform settings by entering, into the entry field 624, a particular IP address, a range of IP addresses, or a specified prefix length and pressing the "OK" button 625. The content set in the entry field 624 is listed in the item "registered applicable IP address" 626, so that each setting content is displayed in the list 627. To change the setting of a registered applicable IP address, the user can press the "delete" button 628 to delete the setting and perform applicable address setting again.

If there are not any problems with the content displayed in the setting screen 615, the user can press an "OK" button 629 to terminate the setting operation, so that the final setting content is transmitted from the operation unit 140 to the control unit 110. The control unit 110 stores the setting content received from the operation unit 140 into the HDD 150, and then performs processing according to the flowchart of FIG. 7 using the stored setting content, thus implementing the function of the present exemplary embodiment. The above-described setting screen is used to specify an RFC specification to be used for generating a value indicating a status to be returned in response to a packet requesting the status acquisition for each address of an information processing apparatus that is a transmission source of the packet or for each range of addresses of information processing apparatuses that are transmission sources of the packet. In addition, any types of setting methods may be employed as long as similar specifying operations can be performed.

Next, switching processing of a reply value indicating a status value of the image processing apparatus 100 generated based on the setting content illustrated in FIG. 6 is described with reference to FIG. 7.

Figure 7:
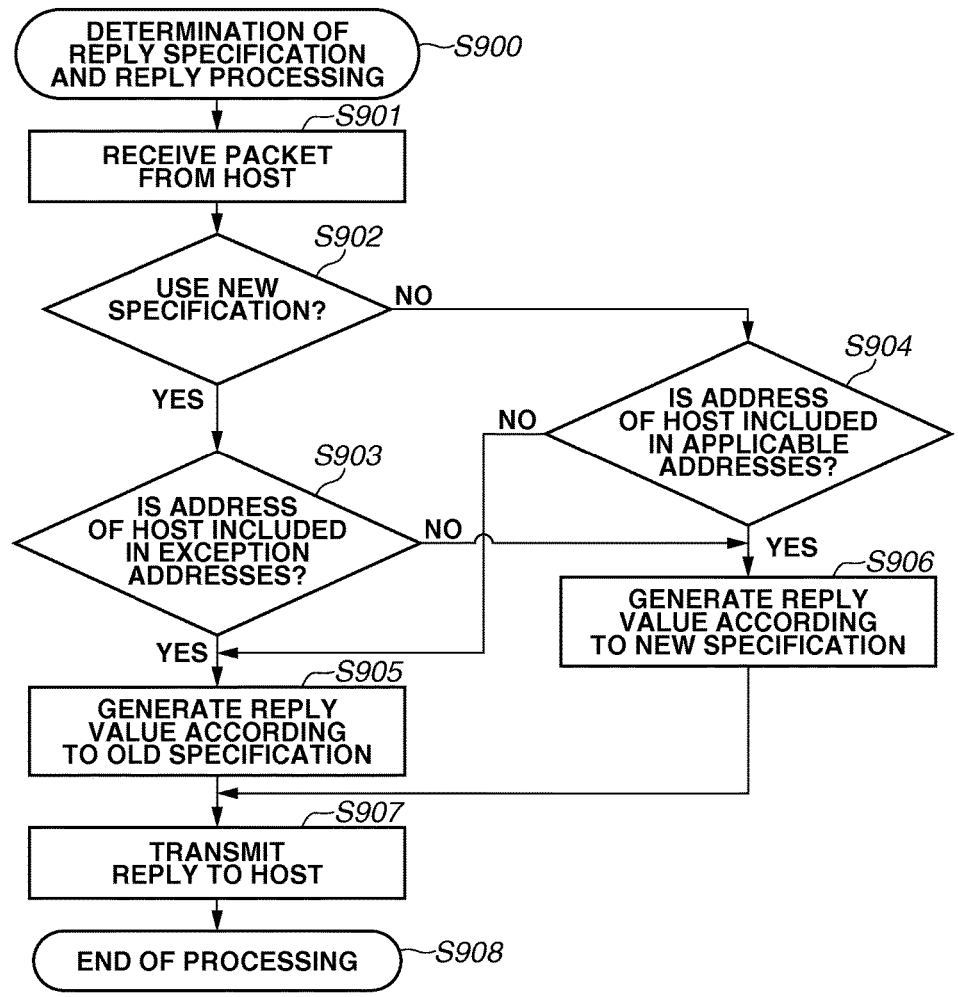
FIG. 7 is a flowchart illustrating an example of a flow of specification switching processing according to the first exemplary embodiment.

FIG. 7 is a flowchart illustrating an example of switching processing of a reply value indicating a status value of the image processing apparatus 100 according to the first exemplary embodiment. Processing illustrated in the flowchart of FIG. 7 is implemented by a central processing unit (CPU) of the control unit 110 of the image processing apparatus 100 reading and executing a program stored in the ROM or the HDD 150.

In step S900, the image processing apparatus 100 starts processing. In step S901, the control unit 110 receives a packet for inquiring about the object hrPrinterDetectedErrorState of the Host Resources MIB from the PC 161 or the PC 162. Then, the processing proceeds to step S902.

In step S902, the control unit 110 determines whether it is set to use the new specification based on the setting content set in the setting item 601 or 616 illustrated in FIG. 6. If the control unit 110 determines that it is set to use the new specification (YES in step S902), the processing proceeds to step S903.

In step S903, the control unit 110 refers to the setting content set in the setting item 604 illustrated in FIG. 6 and determines whether the IP address of a PC that is a transmission source of the packet received in step S901 is included in the exception IP addresses displayed in the list 612. If the control unit 110 determines that the setting content in the setting item 604 illustrated in FIG. 6 is to "use" the exception addresses with the button 605 selected and that the IP address of a PC that is a transmission source of the packet received in step S901 is included in the exception IP addresses displayed in the list 612 (YES in step S903), the processing proceeds to step S905. In step S905, the control unit 110 generates a reply value, which is used for returning the status of the image processing apparatus 100 according to the old specification (a reply value conforming to the old specification), and a packet. Then, the processing proceeds to step S907.

If, in step S903, the control unit 110 determines that the setting content in the setting item 604 illustrated in FIG. 6 is to "do not use" the exception addresses with the button 606 selected and that the IP address of a PC that is a transmission source of the packet received in step S901 is not included in the exception IP addresses displayed in the list 612 (NO in step S903), the processing proceeds to step S906. In step S906, the control unit 110 generates a reply value, which is used for returning the status of the image processing apparatus 100 according to the new specification (a reply value conforming to the new specification), and a packet. Then, the processing proceeds to step S907.

In step S907, the control unit 110 transmits, as a reply, a packet of the reply value generated in step S905 or S906 to the PC that is a transmission source of the packet received in step S901. In step S908, the control unit 110 terminates a series of processing operations.

If, in step S902, the control unit 110 determines that it is not set to use the new specification (NO in step S902), the processing proceeds to step S904. In step S904, the control unit 110 refers to the setting content set in the setting item 619 illustrated in FIG. 6 and determines whether the IP address of a PC that is a transmission source of the packet received in step S901 is included in the applicable IP addresses displayed in the list 627. Then, if the control unit 110 determines that the setting content in the setting item 619 illustrated in FIG. 6 is to "do not use" the applicable addresses with the button 621 selected or that the IP address of a PC that is a transmission source of the packet received in step S901 is not included in the applicable IP addresses displayed in the list 627 (NO in step S904), the processing proceeds to step S905. On the other hand, if the control unit 110 determines that the setting content in the setting item 619 illustrated in FIG. 6 is to "use" the applicable addresses with the button 620 selected and that the IP address of a PC that is a transmission source of the packet received in step S901 is included in the applicable IP addresses displayed in the list 627 (YES in step S904), the processing proceeds to step S906. Processing operations in step S905 or S906 and subsequent steps are similar to those described in the foregoing, and the description thereof is, therefore, omitted.

As described above, the first exemplary embodiment enables a reply value indicating a status of the image processing apparatus to follow the conformity of the new RFC or old RFC in the object hrPrinterDetectedErrorState on the side of a monitoring application (a host). As a result, such a situation can be avoided that the image processing apparatus makes a reply conforming to the new RFC specification to a monitoring application that can interpret only the old RFC specification and the monitoring application thus makes an erroneous determination. Furthermore, conversely, such a situation can also be avoided that the image processing apparatus can perform only status notification in a narrow range defined by the old RFC to a monitoring application conforming to the new RFC. Accordingly, the monitoring application can continuously perform constant appropriate status monitoring.

In the above-described first exemplary embodiment, a configuration for switching the new or old specification, which is used to generate a reply value, according to the IP address of a transmission source of a packet requesting status acquisition has been described. In a second exemplary embodiment, a configuration for switching the new or old specification, which is used to generate a reply value, according to the deadline for switching between the new and old specifications and the time range setting for every day of the week is described. In the following, a setting screen used for such switching is described with reference to FIG. 8, and an operation of the image processing apparatus is described with reference to the flowchart of FIG. 9.

Figure 8:
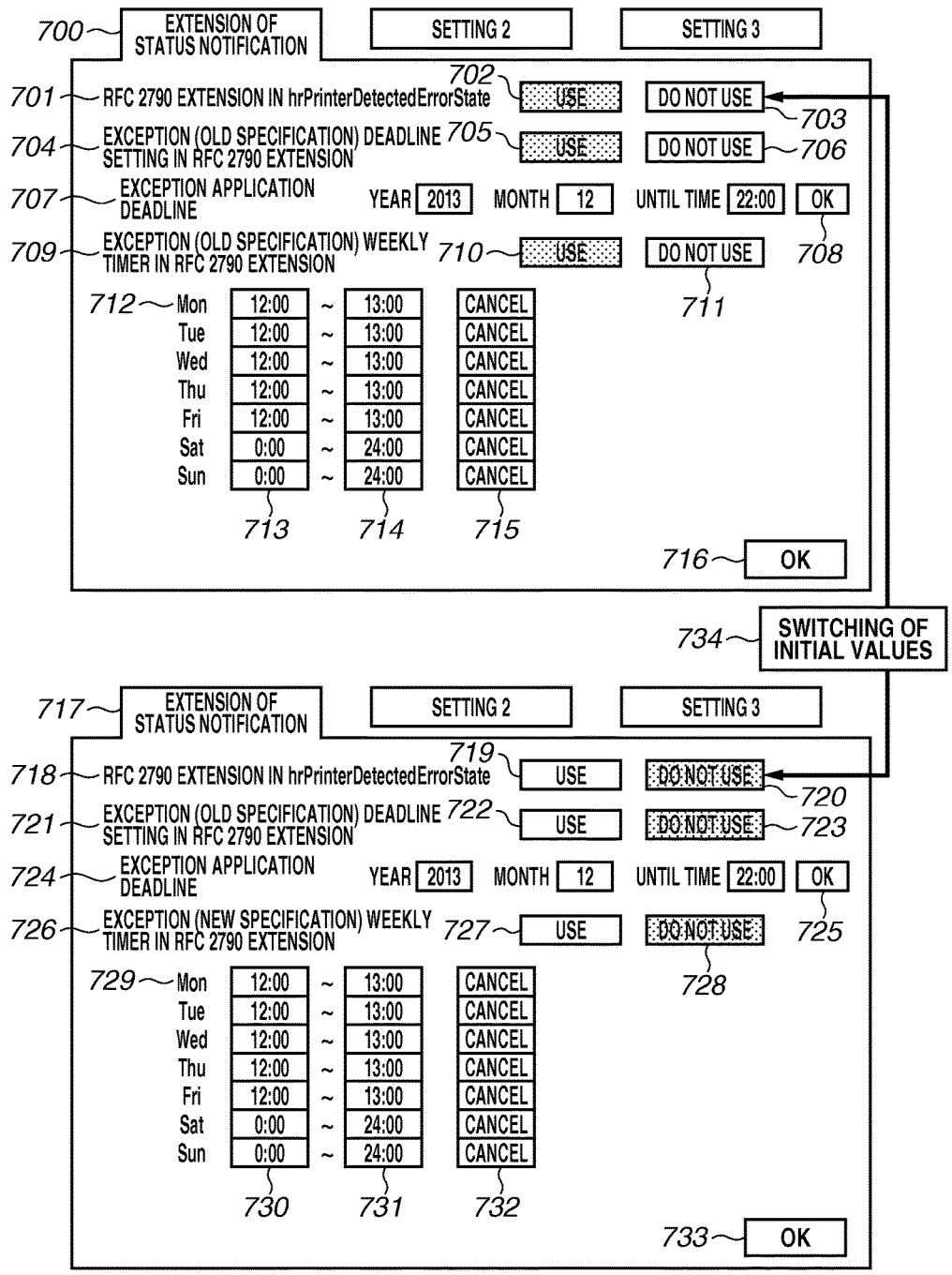
FIG. 8 illustrates examples of UI setting screens according to a second exemplary embodiment.

FIG. 8 illustrates examples of user interface (UI) setting screens according to the second exemplary embodiment. Each UI setting screen is displayed on a display screen of the operation unit 140 under the control of the control unit 110 of the image processing apparatus 100. The setting screen illustrated in FIG. 8 is used to make a designation about to which one of a plurality of RFC specifications the RFC specification associated with the definition of values indicating statuses of the image processing apparatus 100 is set. Here, the following description is made using the operation unit 140 of the image processing apparatus 100. However, instead of the operation unit 140, a web browser (not illustrated) on a personal computer (PC) (161 or 162) may be connected to a remote UI function of the image processing apparatus 100 and may be used to perform similar settings.

Referring to FIG. 8, a screen 700, which is a display example, is used to switch the new and old specifications. A setting item 701 is used to set the use or nonuse of the extended definitions in bit8 to bit15 in the hrPrinterDetectedErrorState specification extended in RFC 2790 illustrated in FIGS. 2A and 2B. In the present exemplary embodiment, the setting in the setting item 701 is described using a choice between only two things "use" and "do not use". However, in a case where the response specification is further extended, more settable choices may be added, and the display and processing operations of the operation unit 140 may be modified so as to allow the user to perform settings among the two or more choices. If a button "use" 702 is set, the image processing apparatus 100 is set to make a status reply conforming to RFC 2790. If a button "do not use" 703 is set, the image processing apparatus 100 is set to make a status reply conforming to RFC 1514.

Furthermore, a setting item 704 is used to set whether to use, as an exception, not a reply value conforming to the extended specification of RFC 2790 but a reply value conforming to the old specification of RFC 1514 until a specific deadline. If a button "use" 705 is selected by the user, the content of such selection is transmitted from the operation unit 140 to the control unit 110, so that a setting item 707 used for setting an exception deadline become available for entry. When the user presses an "OK" button 708 after entering a specific exception deadline, the setting of the exception deadline is completed. If a button "do not use" 706 is selected by the user, the entry items of the setting item 707 used for setting the exception deadline are masked and the operation unit 140 does not accept any entry into the entry items by the user.

A setting item 709 is used to set the use or nonuse of exception setting for using not a reply value conforming to the extended specification of RFC 2790 but a reply conforming to the old specification of RFC 1514 on each day of the week and during a time range of each day of the week. If a button "use" 710 is selected by the user, the content of such selection is transmitted from the operation unit 140 to the control unit 110, so that setting items 712 to 715 used for setting exception settings become available for entry. If a button "do not use" 711 is selected by the user, the setting items 712 to 715 used for setting exception settings are masked and the operation unit 140 does not accept any entry into the setting items 712 to 715 by the user.

For each day of the week 712, the user can enter the start time of exception application into a field 713 and enter the end time of exception application into a field 714. To cancel the exception setting, the user can press a "cancel" button 715 provided for each day of the week.

If there are not any problems with the content displayed in the setting screen 700, the user can press an "OK" button 716 to terminate the setting operation, so that the final setting content is transmitted from the operation unit 140 to the control unit 110. The setting screen 700 is an example of an input screen displayed in the case of, under the premise of using RFC 2790, setting the deadline and the exception application for each day of the week that involve a reply conforming to the old specification of RFC 1514 as exception setting. If the user presses the button "do not use" 703 in the displayed setting screen 700, switching of initial values 734 is performed, so that the setting screen 700 is switched to a setting screen 717.

In the following, an example of setting content displayed in a case where the button "do not use" 703 is set so as not to use RFC 2790 is described using the setting screen 717. An example of the setting screen 717 is premised on using the old specification of RFC 1514. A setting item 718 is used to set whether to use the extended specification of RFC 2790. In the present exemplary embodiment, the setting in the setting item 718 is described using a choice between only two things "use" and "do not use". However, in a case where the response specification is further extended, more settable choices may be added, and the display and processing operations of the operation unit 140 may be modified so as to allow the user to perform settings among the two or more choices. If a button "use" 719 is set, the image processing apparatus 100 is set to make a status reply conforming to the RFC 2790 specification. If a button "do not use" 720 is set, the image processing apparatus 100 is set to make a status reply conforming to the RFC 1514 specification. Here, if the user presses the button "use" 719, switching of initial values 734 is performed, so that the setting screen 717 is switched to the setting screen 700.

Setting items 721 to 725 are similar to the above-mentioned setting items 704 to 708, and the description thereof is, therefore, omitted. A setting item 726 is used to set the use or nonuse of exception setting for using not a reply conforming to the old specification of RFC 1514 but a reply value conforming to the new specification of RFC 2790 on each day of the week and during a time range of each day of the week. If a button "use" 727 is selected by the user, the content of such selection is transmitted from the operation unit 140 to the control unit 110, so that setting items 729 to 732 used for setting exception settings become available for entry. If a button "do not use" 728 is selected by the user, the setting items 729 to 732 used for setting exception settings are masked and the operation unit 140 does not accept any entry into the setting items 729 to 732 by the user.

For each day of the week 729, the user can enter the start time of exception application into a field 730 and enter the end time of exception application into a field 731. To cancel the exception setting, the user can press a "cancel" button 732 provided for each day of the week.

If there are not any problems with the content displayed in the setting screen 717, the user can press an "OK" button 733 to terminate the setting operation, so that the final setting content is transmitted from the operation unit 140 to the control unit 110. The control unit 110 stores the setting content received from the operation unit 140 into the HDD 150, and then performs processing according to the flowchart of FIG. 9 using the stored setting content, thus implementing the function of the present exemplary embodiment.

Furthermore, in the example setting illustrated in FIG. 8, the old specification or the new specification is used as an exception for each combination of a day of the week and a time range. However, the old specification or the new specification may be used as an exception solely for each day of the week, or the old specification or the new specification may be used as an exception solely for each time range. With the above-described setting screen used, an RFC specification to be used for generating a value indicating a status to be returned in response to a request for status acquisition can be specified for each time range in which the request is received, for each day of the week, or for each combination of a day of the week and a time range. In addition, a deadline for switching the RFC specifications can be specified. Moreover, any types of setting methods may be employed as long as similar specifying operations can be performed.

Next, switching processing of a reply value indicating a status value of the image processing apparatus 100 generated based on the setting content illustrated in FIG. 8 is described with reference to FIG. 9.

Figure 9:
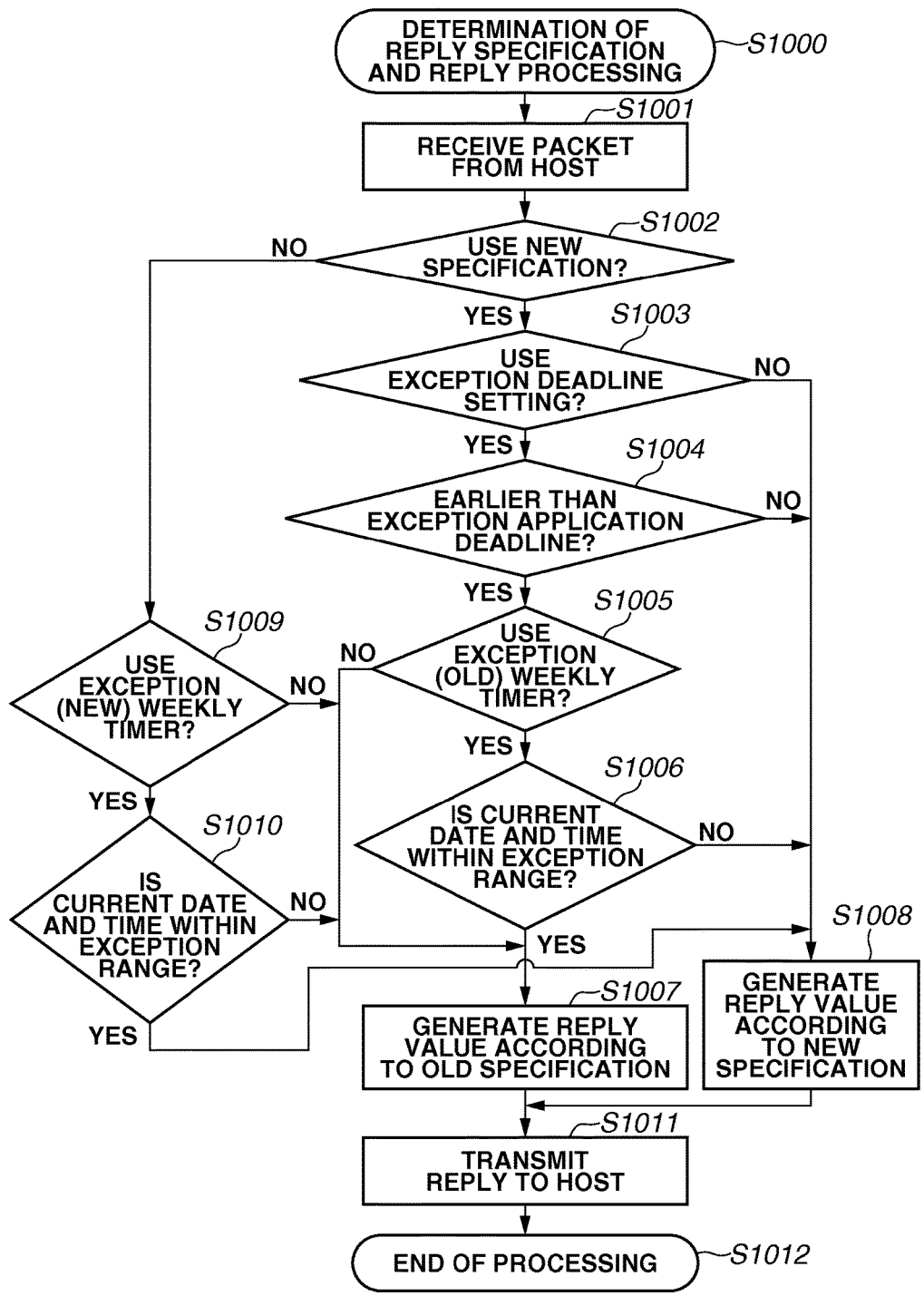
FIG. 9 is a flowchart illustrating an example of a flow of specification switching processing according to the second exemplary embodiment.

FIG. 9 is a flowchart illustrating an example of switching processing of a reply value indicating a status value of the image processing apparatus 100 according to the second exemplary embodiment. Processing illustrated in the flowchart of FIG. 9 is implemented by a central processing unit (CPU) of the control unit 110 of the image processing apparatus 100 reading and executing a program stored in the ROM or the HDD 150.

In step S1000, the image processing apparatus 100 starts processing. In step S1001, the control unit 110 receives a packet for inquiring about the object hrPrinterDetectedErrorState of the Host Resources MIB from the PC 161 or the PC 162. Then, the processing proceeds to step S1002.

In step S1002, the control unit 110 determines whether it is set to use the new specification based on the setting content set in the setting item 701 or 718 illustrated in FIG.

8. If the control unit 110 determines that it is set to use the new specification (YES in step S1002), the processing proceeds to step S1003.

In step S1003, the control unit 110 refers to the setting content set in the setting item 704 illustrated in FIG. 8 and determines whether it is set to "use" the setting of an exception deadline. If the control unit 110 determines that it is set to "use" the setting of an exception deadline (YES in step S1003), the processing proceeds to step S1004.

In step S1004, the control unit 110 compares the date and time set in the setting item 707 used for setting the exception deadline illustrated in FIG. 8 with the current date and time and determines whether the current date and time is earlier than the date and time of the set exception deadline. If the control unit 110 determines that the current date and time is earlier than the date and time of the set exception deadline (YES in step S1004), the processing proceeds to step S1005.

In step S1005, the control unit 110 refers to the setting content set in the setting item 709 illustrated in FIG. 8 and determines whether it is set to "use" an exception (old specification) weekly timer. If the control unit 110 determines that it is set to "use" the exception (old specification) weekly timer (YES in step S1005), the processing proceeds to step S1006. On the other hand, if the control unit 110 determines that it is set to "do not use" the exception (old specification) weekly timer (NO in step S1005), the processing directly proceeds to step S1007.

In step S1006, the control unit 110 compares the setting of exception (old specification) times for each day of the week in the fields 712 to 714 illustrated in FIG. 8 with the current day of the week and the current date and time and determines whether the current day of the week and the current date and time is within a range of the exception times. If the control unit 110 determines that the current day of the week and the current date and time is within a range of the exception times (YES in step S1006), the processing proceeds to step S1007. In step S1007, the control unit 110 generates a reply value, which is used for returning the status of the image processing apparatus 100 according to the old specification, and a packet. Then, the processing proceeds to step S1011.

If, in step S1003, the control unit 110 determines that it is set to "do not use" the setting of an exception deadline (NO in step S1003), the processing proceeds to step S1008. Further, if, in step S1004, the control unit 110 determines that the current date and time is not earlier than the date and time of the set exception deadline (NO in step S1004), the processing proceeds to step S1008. Moreover, if, in step S1006, the control unit 110 determines that the current day of the week and the current date and time is not within a range of the exception times (NO in step S1006), the processing proceeds to step S1008. In step S1008, the control unit 110 generates a reply value, which is used for returning the status of the image processing apparatus 100 according to the new specification, and a packet. Then, the processing proceeds to step S1011.

In step S1011, the control unit 110 transmits, as a reply, a packet of the reply value generated in step S1007 or S1008 to the PC that is a transmission source of the packet received in step S1001. In step S1012, the control unit 110 terminates a series of processing operations.

If, in step S1002, the control unit 110 determines that it is not set to use the new specification (NO in step S1002), the processing proceeds to step S1009. In step S1009, the control unit 110 refers to the setting content set in the setting item 726 illustrated in FIG. 8 and determines whether it is set to "use" an exception (new specification) weekly timer.

If the control unit 110 determines that it is set to "do not use" the exception (new specification) weekly timer (NO in step S1009), the processing directly proceeds to step S1007. On the other hand, if the control unit 110 determines that it is set to "use" the exception (new specification) weekly timer (YES in step S1009), the processing proceeds to step S1010.

In step S1010, the control unit 110 compares the setting of exception (new specification) times for each day of the week in the fields 729 to 731 illustrated in FIG. 8 with the current day of the week and the current date and time and determines whether the current day of the week and the current date and time is within a range of the exception times. If the control unit 110 determines that the current day of the week and the current date and time is not within a range of the exception times (NO in step S1010), the processing proceeds to step S1007. On the other hand, if the control unit 110 determines that the current day of the week and the current date and time is within a range of the exception times (YES in step S1010), the processing proceeds to step S1008. Processing operations in step S1007 or S1008 and subsequent steps are similar to those described in the foregoing, and the description thereof is, therefore, omitted.

As described above, the second exemplary embodiment enables the new and old specifications used for generating a reply value indicating a status of the image processing apparatus to be switched according to the settings of the deadline for switching the new and old specifications and the time range for each day of the week. Accordingly, if the user performs settings according to the date of switching of the new and old specifications or a monitoring schedule on the side of a monitoring application (a host), such a situation can be avoided that the image processing apparatus makes a reply conforming to the new RFC specification to a monitoring application (a host) that can interpret only the old RFC specification and the monitoring application thus makes an erroneous determination. Furthermore, conversely, such a situation can also be avoided that the image processing apparatus can perform only status notification in a narrow range defined by the old RFC to a monitoring application conforming to the new RFC. Accordingly, the monitoring application can continuously perform constant appropriate status monitoring.

In a third exemplary embodiment, a configuration for switching the new or old specification, which is used to generate a reply value, according to protocol versions of the SNMP and operations of a plurality of information acquisition systems existing as specifications of the SNMP is described. In the following, a setting screen used for such switching is described with reference to FIG. 10, and an operation of the image processing apparatus is described with reference to the flowcharts of FIGS. 11 and 12.

Figure 10:
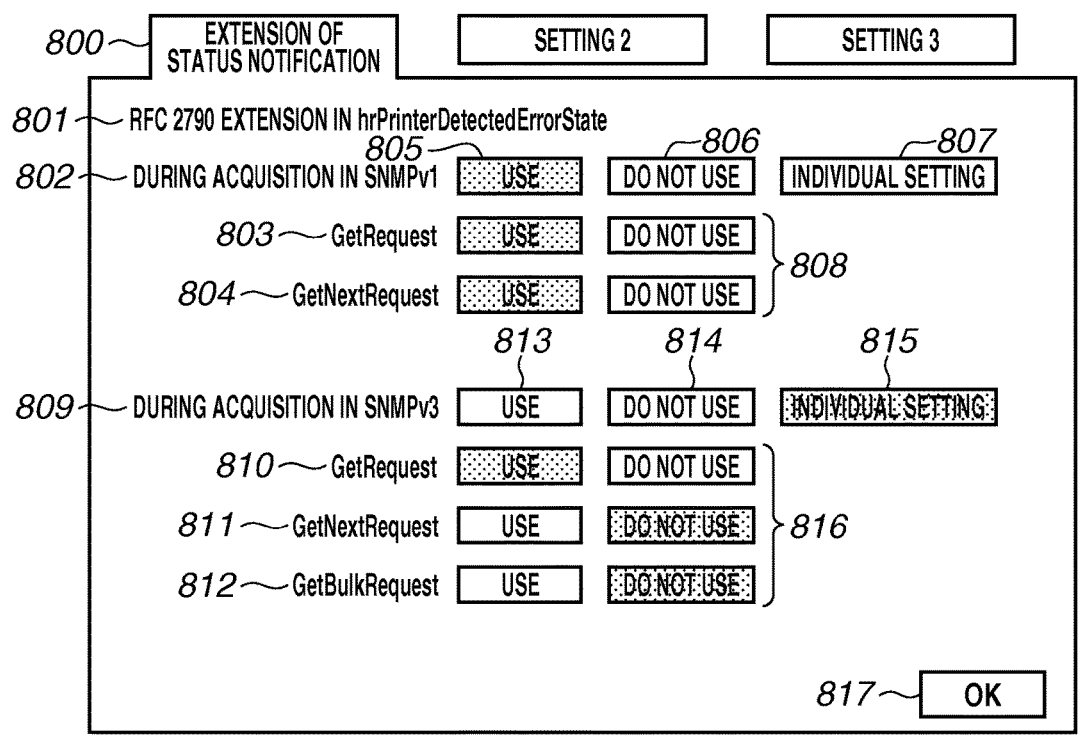
FIG. 10 illustrates examples of a UI setting screen according to a third exemplary embodiment.

FIG. 10 illustrates an example of a UI setting screen according to the third exemplary embodiment. The UI setting screen is displayed on a display screen of the operation unit 140 under the control of the control unit 110 of the image processing apparatus 100. The setting screen illustrated in FIG. 10 is used to make a designation about to which one of a plurality of RFC specifications the RFC specification associated with the definition of values indicating statuses of the image processing apparatus 100 is set. Here, the following description is made using the operation unit 140 of the image processing apparatus 100. However, instead of the operation unit 140, a web browser (not illustrated) on a personal computer (PC) (161 or 162) may be connected to a remote UI function of the image processing apparatus 100 and may be used to perform similar settings.

Referring to FIG. 10, a screen 800, which is a display example, is used to switch the new and old specifications. A setting item 801 is used to set the use or nonuse of the extended definitions in bit8 to bit15 in the hrPrinterDetectedErrorState specification extended in RFC 2790 illustrated in FIGS. 2A and 2B. In the display example illustrated in FIG. 10, the use or nonuse of the extended definitions in RFC 2790 can be set about an information acquisition system operation the protocol version of SNMP of which is "v1" and an information acquisition system operation the protocol version of SNMP of which is "v3".

A setting item 802 is used to set whether to use a reply value conforming to the RFC 2790 extension about an information acquisition system operation the protocol version of SNMP of which is "v1". In the specification of SNMP version 1 (SNMPv1), operations GetRequest 803 and GetNextRequest 804 exist as operations used for a host to acquire MIB information from a target device.

In the setting item 802, if a button "use" 805 is selected, the new specification is applied to all of the operations of the SNMPv1 acquisition system, so that the setting items 808 for the respective operations are masked and the operation unit 140 does not accept any entry into the setting items 808 by the user. If a button "do not use" 806 is selected, the old specification is applied to all of the operations of the SNMPv1 acquisition system, so that the setting items 808 for the respective operations are masked and the operation unit 140 does not accept any entry into the setting items 808 by the user.

When information indicating that a button "individual setting" 807 is selected is transmitted from the operation unit 140 to the control unit 110 of the image processing apparatus 100, the control unit 110 instructs the operation unit 140 to cancel the masking of the setting items 802 for the respective operations. With this instruction, the operation unit 140 becomes ready to accept an entry into the setting items 808 by the user. Accordingly, it becomes possible to set the switching of the new and old specifications for the respective operations GetRequest 803 and GetNextRequest 804.

A setting item 809 is used to set whether to use a reply value conforming to the RFC 2790 extension about an information acquisition system operation the protocol version of SNMP of which is "v3". In the specification of SNMP version 3 (SNMPv3), operations GetRequest 810, GetNextRequest 811, and GetBulkRequest 812 exist as operations used for a host to acquire MIB information from a target device.

In the setting item 809, if a button "use" 813 is selected, the new specification is applied to all of the operations of the SNMPv3 acquisition system, so that the setting items 816 for the respective operations are masked and the operation unit 140 does not accept any entry into the setting items 816 by the user. If a button "do not use" 814 is selected, the old specification is applied to all of the operations of the SNMPv3 acquisition system, so that the setting items 816 for the respective operations are masked and the operation unit 140 does not accept any entry into the setting items 816 by the user.

When information indicating that a button "individual setting" 815 is selected is transmitted from the operation unit 140 to the control unit 110 of the image processing apparatus 100, the control unit 110 instructs the operation unit 140 to cancel the masking of the setting items 816 for the respective operations. With this instruction, the operation unit 140 becomes ready to accept an entry into the setting items 816 by the user. Accordingly, it becomes possible to set the switching of the new and old specifications for the respective operations GetRequest 810, GetNextRequest 811, and GetBulkRequest 812.

If there are not any problems with the content displayed in the setting screen 800, the user can press an "OK" button 817 to terminate the setting operation, so that the final setting content is transmitted from the operation unit 140 to the control unit 110. In the setting screen 800, the setting in the setting items 808 and 816 is described using a choice between only two things "use" and "do not use". However, in a case where the response specification is further extended, more settable choices may be added, and the display and processing operations of the operation unit 140 may be modified so as to allow the user to perform settings among the two or more choices. With the above-described setting screen used, an RFC specification used for generating a reply value indicating a status to be returned in response to a request for status acquisition can be specified for each version of SNMP corresponding to the request. Furthermore, the RFC specification can be specified for each operation of SNMP. In addition, any types of setting methods may be employed as long as similar specifying operations can be performed.

Next, switching processing of a reply value indicating a status value of the image processing apparatus 100 generated based on the setting content illustrated in FIG. 10 is described with reference to FIGS. 11 and 12.

FIGS. 11 and 12 are flowcharts illustrating an example of switching processing of a reply value indicating a status value of the image processing apparatus 100 according to the third exemplary embodiment. Processing illustrated in the flowcharts of FIGS. 11 and 12 is implemented by a central processing unit (CPU) of the control unit 110 of the image processing apparatus 100 reading and executing a program stored in the ROM or the HDD 150.

In step S1100, the image processing apparatus 100 starts processing. In step S1101, the control unit 110 receives a packet for inquiring about the object hrPrinterDetectedErrorState of the Host Resources MIB from the PC 161 or the PC 162. Then, the processing proceeds to step S1102. The present exemplary embodiment is described on the premise that the versions of SNMP supported by the image processing apparatus 100 are "1" and "3".

In step S1102, the control unit 110 analyzes the packet received in step S1101 and determines whether the protocol version of SNMP is "1". If the control unit 110 determines that the protocol version of SNMP is "1" (YES in step S1102), the processing proceeds to step S1106.

In step S1106, the control unit 110 determines whether it is set to "use" the new specification based on the setting content set in the setting item 802 illustrated in FIG. 10. If the control unit 110 determines that it is set in the setting content set in the setting item 802 to "use" the new specification (YES in step S1106), the processing proceeds to step S1107. In step S1107, the control unit 110 generates a reply value, which is used for returning the status of the image processing apparatus 100 according to the new specification, and a packet. Then, the processing proceeds to step S1108.

On the other hand, if, in step S1106, the control unit 110 determines that it is not set in the setting content set in the setting item 802 to "use" the new specification (NO in step S1106), the processing proceeds to step S1110. In step S1110, the control unit 110 determines whether the setting content in the setting item 802 is "individual setting". If the control unit 110 determines that the setting content in the setting item 802 is not "individual setting" (NO in step S1110), i.e., if the control unit 110 determines that the setting content in the setting item 802 is "do not use", the processing proceeds to step S1113. In step S1113, the control unit 110 generates a reply value, which is used for returning the status of the image processing apparatus 100 according to the old specification, and a packet. Then, the processing proceeds to step S1108.

In step S1108, the control unit 110 transmits, as a reply, a packet of the reply value generated in step S1107 or S1113 to the PC that is a transmission source of the packet received in step S1101. Then, in step S1109, the control unit 110 terminates a series of processing operations.

If, in step S1110, the control unit 110 determines that the setting content in the setting item 802 is "individual setting" (YES in step S1110), the processing proceeds to step S1111. In step S1111, the control unit 110 determines whether the SNMP operation is "GetRequest". If the control unit 110 determines that the SNMP operation is "GetRequest" (YES in step S1111), the processing proceeds to step S1112. In step S1112, the control unit 110 refers to the setting value of the operation "GetRequest" set in the setting item 808 illustrated in FIG. 10 and determines whether it is set to "use" the new specification. If the control unit 110 determines that it is set in the setting value of the operation "GetRequest" to "use" the new specification (YES in step S1112), the processing proceeds to step S1107. On the other hand, if the control unit 110 determines that it is set in the setting value of the operation "GetRequest" to "do not use" the new specification (NO in step S1112), the processing proceeds to step S1113. Processing operations in step S1107 or S1113 and subsequent steps are similar to those described in the foregoing, and the description thereof is, therefore, omitted.

If, in step S1111, the control unit 110 determines that the SNMP operation is not "GetRequest" (NO in step S1111), the processing proceeds to step S1114. In step S1114, the control unit 110 determines whether the SNMP operation is "GetNextRequest". If the control unit 110 determines that the SNMP operation is "GetNextRequest" (YES in step S1114), the processing proceeds to step S1115. In step S1115, the control unit 110 refers to the setting value of the operation "GetNextRequest" set in the setting item 808 illustrated in FIG. 10 and determines whether it is set to "use" the new specification. If the control unit 110 determines that it is set in the setting value of the operation "GetNextRequest" to "use" the new specification (YES in step S1115), the processing proceeds to step S1107. On the other hand, if the control unit 110 determines that it is set in the setting value of the operation "GetNextRequest" to "do not use" the new specification (NO in step S1115), the processing proceeds to step S1113. Processing operations in step S1107 or S1113 and subsequent steps are similar to those described in the foregoing, and the description thereof is, therefore, omitted.

If, in step S1114, the control unit 110 determines that the SNMP operation is not "GetNextRequest" (NO in step S1114), the processing proceeds to step S1116. In step S1116, the control unit 110 determines that the SNMP operation is other than the predetermined operations of SNMPv1, generates a packet for returning an error reply, and returns the error reply to the PC that is a transmission source of the packet received in step S1101. Then, in step S1109, the control unit 110 terminates a series of processing operations.

If, in step S1102, the control unit 110 determines that the protocol version of SNMP is not "1" (NO in step S1102), the processing proceeds to step S1103. In step S1103, the control unit 110 determines whether the protocol version of SNMP is "3". If the control unit 110 determines that the protocol version of SNMP is not "3" (NO in step S1103), the processing proceeds to step S1105. In step S1105, since the protocol version of SNMP is other than the supported versions, the control unit 110 discards the packet received in step S1101. Then, the processing proceeds to step S1109, in which the control unit 110 terminates the processing.

On the other hand, if the control unit 110 determines that the protocol version of SNMP is "3" (YES in step S1103), the processing proceeds to step S1104. Processing in step S1104 and subsequent steps is described as processing in step S1200 and subsequent steps illustrated in FIG. 12.

Referring to FIG. 12, in step S1200, the control unit 110 starts determination processing to be performed in a case where the protocol version of SNMP is "3". In step S1201, the control unit 110 determines whether it is set to "use" the new specification based on the setting content set in the setting item 809 illustrated in FIG. 10. If the control unit 110 determines that it is set in the setting content set in the setting item 809 to "use" the new specification (YES in step S1201), the processing proceeds to step S1202. In step S1202, the control unit 110 generates a reply value, which is used for returning the status of the image processing apparatus 100 according to the new specification, and a packet. Then, the processing proceeds to step S1203.

On the other hand, if, in step S1201, the control unit 110 determines that it is not set in the setting item 809 to "use" the new specification (NO in step S1201), the processing proceeds to step S1205. In step S1205, the control unit 110 determines whether the setting content in the setting item 809 is "individual setting". If the control unit 110 determines that the setting content in the setting item 809 is not "individual setting" (NO in step S1205), i.e., if the control unit 110 determines that the setting content in the setting item 809 is "do not use", the processing proceeds to step S1208. In step S1208, the control unit 110 generates a reply value, which is used for returning the status of the image processing apparatus 100 according to the old specification, and a packet. Then, the processing proceeds to step S1203.

In step S1203, the control unit 110 transmits, as a reply, a packet of the reply value generated in step S1202 or S1208 to the PC that is a transmission source of the packet received in step S1101 illustrated in FIG. 11. Then, in step S1204, the control unit 110 terminates a series of processing operations.

If, in step S1205, the control unit 110 determines that the setting content in the setting item 809 is "individual setting" (YES in step S1205), the processing proceeds to step S1206. In step S1206, the control unit 110 determines whether the SNMP operation is "GetRequest". If the control unit 110 determines that the SNMP operation is "GetRequest" (YES in step S1206), the processing proceeds to step S1207. In step S1207, the control unit 110 refers to the setting value of the operation "GetRequest" set in the setting item 816 illustrated in FIG. 10 and determines whether it is set to "use" the new specification. If the control unit 110 determines that it is set in the setting value of the operation "GetRequest" to "use" the new specification (YES in step S1207), the processing proceeds to step S1202. On the other hand, if the control unit 110 determines that it is set in the setting value of the operation "GetRequest" to "do not use" the new specification (NO in step S1207), the processing proceeds to step S1208. Processing operations in step S1202 or S1208 and subsequent steps are similar to those described in the foregoing, and the description thereof is, therefore, omitted.

If, in step S1206, the control unit 110 determines that the SNMP operation is not "GetRequest" (NO in step S1206), the processing proceeds to step S1209. In step S1209, the control unit 110 determines whether the SNMP operation is "GetNextRequest". If the control unit 110 determines that the SNMP operation is "GetNextRequest" (YES in step S1209), the processing proceeds to step S1210. In step S1210, the control unit 110 refers to the setting value of the operation "GetNextRequest" set in the setting item 816 illustrated in FIG. 10 and determines whether it is set to "use" the new specification. If the control unit 110 determines that it is set in the setting value of the operation "GetNextRequest" to "use" the new specification (YES in step S1210), the processing proceeds to step S1202. On the other hand, if the control unit 110 determines that it is set in the setting value of the operation "GetNextRequest" to "do not use" the new specification (NO in step S1210), the processing proceeds to step S1208. Processing operations in step S1202 or S1208 and subsequent steps are similar to those described in the foregoing, and the description thereof is, therefore, omitted.

If, in step S1209, the control unit 110 determines that the SNMP operation is not "GetNextRequest" (NO in step S1209), the processing proceeds to step S1211. In step S1211, the control unit 110 determines whether the SNMP operation is "GetBulkRequest". If the control unit 110 determines that the SNMP operation is "GetBulkRequest" (YES in step S1211), the processing proceeds to step S1212. In step S1212, the control unit 110 refers to the setting value of the operation "GetBulkRequest" set in the setting item 816 illustrated in FIG. 10 and determines whether it is set to "use" the new specification. If the control unit 110 determines that it is set in the setting value of the operation "GetBulkRequest" to "use" the new specification (YES in step S1212), the processing proceeds to step S1202. On the other hand, if the control unit 110 determines that it is set in the setting value of the operation "GetBulkRequest" to "do not use" the new specification (NO in step S1212), the processing proceeds to step S1208. Processing operations in step S1202 or S1208 and subsequent steps are similar to those described in the foregoing, and the description thereof is, therefore, omitted.

If, in step S1211, the control unit 110 determines that the SNMP operation is not "GetBulkRequest" (NO in step S1211), the processing proceeds to step S1213. In step S1213, the control unit 110 determines that the SNMP operation is other than the predetermined operations of SNMPv3, generates a packet for returning an error reply, and returns the error reply to the PC that is a transmission source of the packet received in step S1101 illustrated in FIG. 11. Then, in step S1204, the control unit 110 terminates a series of processing operations.

As described above, the third exemplary embodiment enables the new and old specifications used for generating a reply value indicating a status of the image processing apparatus to be switched according to protocol versions of the SNMP and operations of a plurality of information acquisition systems existing as specifications of the SNMP. Accordingly, such a situation can be avoided that the image processing apparatus makes a reply conforming to the new RFC specification to a monitoring application (a host) that can interpret only the old RFC specification and the monitoring application thus makes an erroneous determination. Furthermore, conversely, such a situation can also be avoided that the image processing apparatus can perform only status notification in a narrow range defined by the old RFC to a monitoring application conforming to the new RFC. Accordingly, the monitoring application can continuously perform constant appropriate status monitoring.

Furthermore, the above-described first to third exemplary embodiments can be combined to configure the above-described functions.

In a fourth exemplary embodiment, a configuration for sampling an interval of status acquisition for each of IP addresses of apparatuses requesting status acquisition in two separate cases, one case where the image processing apparatus 100 is normal and the other case where the image processing apparatus 100 is not normal and for switching the new or old specification, which is used to generate a reply value, for each IP address based on a result of sampling is described. In the following, sampling processing is described with reference to the flowchart of FIG. 13, a result of sampling is described with reference to FIG. 14, and switching processing by the image processing apparatus 100 is described with reference to the flowchart of FIG. 15.

First, processing for sampling an interval of status acquisition for each of IP addresses of apparatuses requesting status acquisition in two separate cases, one case where the image processing apparatus 100 is normal and the other case where the image processing apparatus 100 is not normal is described with reference to FIG. 13.

FIG. 13 is a flowchart illustrating an example of sampling processing performed by the image processing apparatus 100 according to the fourth exemplary embodiment. Processing illustrated in the flowchart of FIG. 13 is implemented by a central processing unit (CPU) of the control unit 110 of the image processing apparatus 100 reading and executing a program stored in the ROM or the HDD 150.

In step S1300, the control unit 110 of the image processing apparatus 100 starts processing for performing sampling. In step S1301, the control unit 110 determines whether the object hrPrinterDetectedErrorState is included in the received SNMP packet. If the control unit 110 determines that the object hrPrinterDetectedErrorState is not included in the received SNMP packet (NO in step S1301), the processing proceeds to step S1302.

In step S1302, the control unit 110 determines whether a termination condition for sampling has been reached. For the termination condition for sampling, for example, a predetermined number of times or a predetermined time is used, but these are not restrictive. If the control unit 110 determines that the termination condition for sampling has not yet been reached (NO in step S1302), the processing returns to step S1301, in which the control unit 110 continues processing for sampling.

If, in step S1301, the control unit 110 determines that the object hrPrinterDetectedErrorState is included in the received SNMP packet (YES in step S1301), the processing proceeds to step S1304. In step S1304, the control unit 110 determines whether an entry of an IP address of the PC 161 or 162 requesting status acquisition with the object hrPrinterDetectedErrorState received in step S1301 is present on a sampling table. The sampling table is such as that illustrated in FIG. 14, to be described below, and is stored in, for example, the HDD 150.

If, in step S1304, the control unit 110 determines that the entry is not present on the sampling table (NO in step S1304), the processing proceeds to step S1308. In step S1308, the control unit 110 generates a new entry on the sampling table. Then, the processing proceeds to step S1302.

On the other hand, if in step S1304, the control unit 110 determines that the entry is present on the sampling table (YES in step S1304), the processing proceeds to step S1305. In step S1305, the control unit 110 determines whether the last reply that the control unit 110 made to the host requesting status acquisition with the object hrPrinterDetectedErrorState received in step S1301 indicated a status obtained during the normal state of the image processing apparatus 100. Examples of a status obtained during the normal state include a condition "idle" illustrated in FIG. 2B.

If, in step S1305, the control unit 110 determines that the last reply indicated a status obtained during the normal state (YES in step S1305), the processing proceeds to step S1306. In step S1306, the control unit 110 records, on the sampling table, the date and time of the last reply and the date and time of the current inquiry as data about a polling interval of status acquisition request from the host obtained during the normal state of the image processing apparatus 100. Then, the processing proceeds to step S1302.

On the other hand, in step S1305, the control unit 110 determines that the last reply did not indicate a status obtained during the normal state (NO in step S1305), the processing proceeds to step S1307. In step S1307, the control unit 110 records, on the sampling table, the date and time of the last reply and the date and time of the current inquiry as data about a polling interval of status acquisition request from the host obtained during the error state of the image processing apparatus 100. Then, the processing proceeds to step S1302.

Then, if, in step S1302, the control unit 110 determines that the termination condition for sampling has been reached (YES in step S1302), the processing proceeds to step S1303, in which the control unit 110 terminates processing for sampling. As described above, with respect to each information processing apparatus that is a transmission source of a packet requesting the status acquisition, the control unit 110 samples an interval from when returning a value indicating a normal state to when receiving a next status acquisition request and an interval from when returning a value indicating an abnormal state to when receiving a next status acquisition request. In addition, any types of sampling methods may be employed as long as similar sampling operations can be performed.

FIG. 14 illustrates an example of the sampling table.

Referring to FIG. 14, a column 1400 represents an entry. In the present exemplary embodiment, the IP address of the PC 161 or the PC 162, which performs status acquisition with respect to the image processing apparatus 100 is used as a key for the entry. However, other information, such as a media access control (MAC) address, may be additionally used as a key for the entry. A column 1401 represents an ordinal number in the number of times of sampling. In the example illustrated in FIG. 14, the number of times of sampling is "3". However, the number of times of sampling may be adjusted to be increased or decreased.

In a column 1402, information is recorded for specifying an interval from the date and time when the control unit 110 made the last reply indicating a status (for example, a condition "idle" illustrated in FIG. 2B) obtained during the normal state of the image processing apparatus 100 to the date and time of the current inquiry with respect to an information acquisition request from the PC 161 or the like. In the example illustrated in FIG. 14, the date and time when the control unit 110 made the last reply indicating a status obtained during the normal state and the date and time of the current inquiry are recorded in the column 1402.

In a column 1403, information is recorded for specifying an interval from the date and time when the control unit 110 made the last reply indicating a status (for example, a condition "noPaper" illustrated in FIG. 2B) obtained during a state other than the normal state of the image processing apparatus 100 to the date and time of the current inquiry with respect to an information acquisition request from the PC 161 or the like. In the example illustrated in FIG. 14, the date and time when the control unit 110 made the last reply indicating a status obtained during a state other than the normal state and the date and time of the current inquiry are recorded in the column 1403.

Cells 1404 and 1405 each represent information of an IP address used as a key for the entry, which increase or decrease in number according to the number of hosts that have performed an information acquisition request. A cell 1406 represents that sampling has not yet been performed.

Next, switching processing of a reply value performed based on a result of sampling illustrated in FIG. 13 is described with reference to FIG. 15.

FIG. 15 is a flowchart illustrating switching processing of a reply value indicating a status value of the image processing apparatus 100 according to the fourth exemplary embodiment. Processing illustrated in the flowchart of FIG. 15 is implemented by a central processing unit (CPU) of the control unit 110 of the image processing apparatus 100 reading and executing a program stored in the ROM or the HDD 150.

In step S1500, the control unit 110 of the image processing apparatus 100 starts processing for determining according to which one of the new and old specifications to return a reply value in response to a status acquisition request. In step S1501, the control unit 110 receives a packet for inquiring about the object hrPrinterDetectedErrorState of the Host Resources MIB from the PC 161 or the PC 162. Then, the control unit 110 compares polling intervals until the host transmits a next packet for information acquisition between when the last reply value was returned with a value indicating a status obtained during the normal state of the image processing apparatus 100 and when the last reply value was returned with a value indicating a status obtained during a state other than the normal state, and determines whether the polling intervals "almost coincide" with each other. The control unit 110 makes this determination according to whether the polling intervals coincide with each other within a predetermined error range. If the polling intervals coincide with each other within the predetermined error range (if a difference between the polling intervals is within the predetermined error range), the control unit 110 determines that the polling intervals "almost coincide" with each other. On the other hand, if the polling intervals do not coincide with each other within the predetermined error range (if a difference between the polling intervals exceeds the predetermined error range), the control unit 110 determines that the polling intervals do not "almost coincide" with each other.

If, in step S1501, the control unit 110 determines that the polling intervals almost coincide with each other between the reply value obtained during the normal state and the reply value obtained during the error state (YES in step S1501), the processing proceeds to step S1502. In step S1502, the control unit 110 determines that the host from which the current status acquisition request has been received does not conform to the new specification of RFC 2790. Thus, the control unit 110 of the image processing apparatus 100 determines that this situation is equivalent to the above-described state illustrated in FIG. 5. Then, the processing proceeds to step S1503.

In step S1503, the control unit 110 determines whether there is the setting of a priority mode for prioritizing one of the new and old specifications (the designation about which one of the new and old specifications is to be prioritized).

The setting of the priority mode is performed by displaying, on the operation unit 140, a screen used for setting one of, for example, the new specification being prioritized, the old specification being prioritized, and no setting, and receiving, from the user via the operation unit 140, an instruction for setting the priority mode. This setting is performed to allow the user to make a final switching determination, because while it is supposed, upon processing in steps S1501 and S1502 described above, that the host does not conform to the new specification, such a situation as that illustrated in FIG. 5 may be caused. Furthermore, this setting may be only once performed at the time of execution of step S1503 and may be stored to be used later, this setting may be performed each time at the time of execution of step S1503, or this setting may be previously performed and stored in the HDD 150. Moreover, this setting may be performed individually for every host, or may be performed in common for all the hosts.

If, in step S1503, the control unit 110 determines that there is not the setting of a priority mode for prioritizing one of the new and old specifications (NO in step S1503), the processing proceeds to step S1510. In step S1510, the control unit 110 performs a flag operation to unset (turn off) a flag for making a reply with the new specification (a new specification flag), thus enabling making a reply with the old specification. The new specification can be stored in a RAM included in the control unit 110.

On the other hand, if, in step S1503, the control unit 110 determines that there is the setting of a priority mode for prioritizing one of the new and old specifications (YES in step S1503), the processing proceeds to step S1504. In step S1504, the control unit 110 determines whether the priority mode is set to prioritize the new specification. If the control unit 110 determines that the priority mode is set to prioritize the old specification (set not to prioritize the new specification) (NO in step S1504), the processing proceeds to step S1510. In step S1510, the control unit 110 unsets (turns off) the new specification flag, as described above. Then, the processing proceeds to step S1506.

On the other hand, if, in step S1504, the control unit 110 determines that the priority mode is set to prioritize the new specification (YES in step S1504), the processing proceeds to step S1505. In step S1505, the control unit 110 sets (turns on) the new specification flag. Then, the processing proceeds to step S1506.

In step S1506, the control unit 110 determines the new or old specification of a reply value according to a value of the new specification flag. Then, the processing proceeds to step S1507. If the new specification flag is on, the control unit 110 determines that the specification of the reply value is the "new specification". On the other hand, if the new specification flag is off, the control unit 110 determines that the specification of the reply value is the "old specification".

In step S1507, the control unit 110 generates a reply value, which is used to return a status of the image processing apparatus 100, and a packet based on the specification determined in step S1506. Then, the processing proceeds to step S1508. In step S1508, the control unit 110 transmits, as a reply, a packet of the reply value generated in step S11507 to the PC that is a transmission source of the packet received in step S1501. Then, in step S1509, the control unit 110 terminates a series of processing operations.

If, in step S1501, the control unit 110 determines that the polling intervals do not almost coincide with each other (NO in step S1501), the processing proceeds to step S1511. In step S1511, the control unit 110 determines that the host conforms to the new specification of RFC 2790. Thus, the control unit 110 of the image processing apparatus 100 determines that this situation is equivalent to the above-described state illustrated in FIG. 4. Then, the processing proceeds to step S1512. In step S1512, the control unit 110 sets (turns on) the new specification flag. Then, the processing proceeds to step S1506. Processing operations in step S1506 and subsequent steps are similar to those described in the foregoing, and the description thereof is, therefore, omitted.

As described above, the fourth exemplary embodiment enables sampling an interval of status acquisition for each of IP addresses of apparatuses requesting status acquisition in two separate cases, one case where the image processing apparatus 100 is normal and the other case where the image processing apparatus 100 is not normal, and switching the new or old specification, which is used to generate a reply value, based on a result of sampling. Accordingly, such a situation can be avoided that the image processing apparatus makes a reply conforming to the new RFC specification to a monitoring application that can interpret only the old RFC specification and the monitoring application thus makes an erroneous determination. Furthermore, conversely, such a situation can also be avoided that the image processing apparatus can perform only status notification in a narrow range defined by the old RFC to a monitoring application conforming to the new RFC. Accordingly, the monitoring application can continuously perform constant appropriate status monitoring.

Accordingly, a value indicating a status that an image processing apparatus returns in response to a request from a host can be followed according to a specification associated with the definition of the value indicating a status in the host, so that the occurrence of such a condition that the status of the image processing apparatus is erroneously determined by the host can be prevented. Therefore, SNMP/MIB can be used to enable the host to correctly grasp the status of the image processing apparatus. The image processing apparatus 100 according to the above-described exemplary embodiments returns, to a host, a value indicating a status of the image processing apparatus 100, which conforms to a specification determined according to an instruction via the above-described UI setting screen or the like, in response to a request issued at a predetermined time interval (for example, at an interval of 10 minutes) from the host. Furthermore, in a case where it is determined by the host that the returned value indicated an abnormal state of the image processing apparatus 100, the image processing apparatus 100 returns, to the host, a value indicating a status of the image processing apparatus 100, which conforms to a specification determined according to an instruction via the above-described UI setting screen or the like, in response to a request issued at a time interval shorter than the predetermined time interval (for example, at an interval of 30 seconds) from the host. In addition, in a case where the standard of RFC or the like is updated to add a new specification, image processing apparatuses that are able to make a response conforming to the added specification and image processing apparatuses that are unable to do so coexist, while hosts that are able to understand the added specification and hosts that are unable to do so coexist. Even in such coexistence environment, the status of an image processing apparatus can be appropriately managed.

Furthermore, the above-described various data structures and contents thereof are not restrictive, but may be changed or modified in various manners depending on applications or purposes.

While various exemplary embodiments have been described above, the present invention can also be embodied as, for example, a system, an apparatus, a method, a program, or a storage medium. In addition, the present invention can also be applied to a system composed of a plurality of devices, or to an apparatus composed only of a single device.

Moreover, the present invention also includes a configuration obtained by combining some or all of the above-described exemplary embodiments.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-056050 filed Mar. 19, 2014, which is hereby incorporated by reference herein in its entirety.

What is claimed is:

1. An image processing apparatus comprising:
a memory device that stores a set of instructions; and
at least one processor that executes the instructions to:
connect the image processing apparatus with a first information processing apparatus which is compatible with a first specification of a communications protocol and is not compatible with a second specification of said communications protocol and a second information processing apparatus which is compatible with the second specification;
input an instruction of selecting a specification from among a plurality of specifications including the first specification and the second specification, the selected specification being used for notifying an information processing apparatus connected with the image processing apparatus of a status of the image processing apparatus;
receive, from the connected information processing apparatus, a transmission request for status information indicating a status of the image processing apparatus; and
transmit, according to the specification selected by the input instruction, the status information in response to the transmission request,
wherein a value of the status information is represented by the first specification with a first bit length and said value of the status information is represented by the second specification with a second bit length which is longer than the first bit length, and
wherein the stored instructions further comprising instructions to: store, in a storage unit,
a first interval information indicating first interval from a transmission of the status information indicating a normal state of the image processing apparatus until a reception of a next transmission request, and
a second interval information indicating second interval from a transmission of the status information indicating an error state of the image processing apparatus until a reception of a next transmission request; and
execute steps of:
comparing the length of the first interval and the second interval, determining, based on the result of the comparing, whether the connected information processing apparatus is compatible with the first specification of the communications protocol,
setting, in a case where it is determined that the connected information processing apparatus is compatible with the first specification, the first specification as the specification to be used to transmit the status information, and
setting, in a case where it is determined that the connected information processing apparatus is not compatible with the first specification, the second specification of the communications protocol as the specification to be used to transmit the status information.

2. The image processing apparatus according to claim 1, wherein a time interval between receptions of the transmission requests from the connected information processing apparatus differs depending on whether the status information indicating that the status of the image forming apparatus is a normal state is transmitted or the status information indicating that the status of the image forming apparatus is an error state is transmitted, and
if the status information indicating that the status of the image forming apparatus is the normal state is transmitted, the time interval becomes a normal interval, and
if the status information indicating that the status of the image forming apparatus is the error state is transmitted, the time interval becomes shorter than the normal time interval.

3. The image processing apparatus according to claim 1, wherein the stored instructions further comprising instructions to:
receive the transmission request from a plurality of information processing apparatuses including the first information processing apparatus and the second information processing apparatus,
input a plurality of instructions, of selecting the specification of the communications protocol, each of which is for an address of a different one of the plurality of information processing apparatuses, and
transmit, according to the specification selected based on an address of the information processing apparatus from which the transmission request and the input instruction is received, the status information in response to the transmission request.

4. The image processing apparatus according to claim 1, wherein the stored instructions further comprising instructions to:
input a plurality of instructions, of selecting the specification of the communications protocol, each of which is for a different time range, a different day of the week, or a different combination of a time range and a day of the week at which the transmission request is received, and transmit, according to the specification determined based on the time range, the day of the week, or each combination of a time range and a day of the week at which the transmission request is received and the input instruction, the status information in response to the transmission request.

5. The image processing apparatus according to claim 1, wherein the stored instructions further comprising instructions to:

input a plurality of the instructions to designate a deadline for switching from a specification to a different specification among the plurality of specifications of a communications protocol which is used for notifying the information processing apparatus connected with the image processing apparatus of a status of the image processing apparatus, and transmit, according to the specification determined based on date and time at which the transmission request is received and the input instruction, the status information in response to the transmission request.

6. The image processing apparatus according to claim 1, wherein the communications protocol is Simple Network Management Protocol (SNMP), and the stored instructions further comprising instructions to:

input the instruction of selecting one of a plurality of versions of SNMP which is used for notifying the information processing apparatus connected with the image processing apparatus of a status of the image processing apparatus, and transmit, according to the version of SNMP selected by the input instruction, the status information in response to the transmission request.

7. The image processing apparatus according to claim 1, wherein the communications protocol is Simple Network Management Protocol (SNMP), and the stored instructions further comprising instructions to:

input the instruction of selecting versions of SNMP for each operation of the SNMP, and transmit, according to the version of SNMP determined based on an SNMP operation corresponding to the transmission request and the input instruction, the status information in response to the transmission request.

8. The image processing apparatus according to claim 1, wherein the stored instructions further comprising instructions to execute steps of:

determining that the connected information processing apparatus is compatible with the first specification in a case where the length of the first interval corresponds to the length of the second interval, and determining that the connected information processing apparatus is compatible with the second specification in a case where the length of the first interval does not correspond to the length of the second interval.

9. The image processing apparatus according to claim 1, wherein the value indicating the transmitted status information is represented with 8 bits in a case where the status information is transmitted according to the first specification of the communications protocol, and the value indicating the transmitted status information is represented with 16 bits in a case where the status information is transmitted according to the second specification of the communications protocol.

10. The image processing apparatus according to claim 9, wherein the first information processing apparatus interprets only a lower 8 bits of the value indicating the status information even if the value indicating the status information which is represented with 16 bits is received, and the second information processing apparatus interrupts 16 bits of the value indicating the status information if the value indicating the status information which is represented with 16 bits is received.

11. The image processing apparatus according to claim 1, wherein the communications protocol is Simple Network Management Protocol (SNMP), and wherein a plurality of specifications of the SNMP includes the first specification defined by RFC1514 and the second specification defined by RFC 2790.

12. An image processing apparatus comprising:

a memory device that stores a set of instructions; and at least one processor that executes the instructions to:

connect the image processing apparatus with a first information processing apparatus which is compatible with a first specification of Simple Network Management Protocol (SNMP) defined by RFC1514 and is not compatible with a second specification of SMNP defined by RFC 2790, and a second information processing apparatus which is compatible with a second specification of SNMP defined by RFC 2790;

input an instruction of selecting a specification from among a plurality of specifications including the first specification and the second specification, the selected specification being used for notifying an information processing apparatus connected with the image processing apparatus of a status of the image processing apparatus;

receive, from the connected information processing apparatus, a transmission request for status information indicating a status of the image processing apparatus; and transmit, according to the specification selected by the input instruction, the status information in response to the transmission request, wherein the stored instructions further comprising instructions to: store, in a storage unit, a first interval information indicating first interval from a transmission of the status information indicating a normal state of the image processing apparatus until a reception of a next transmission request, and a second interval information indicating second interval from a transmission of the status information indicating an error state of the image processing apparatus until a reception of a next transmission request; and execute steps of:

comparing the length of the first interval and the second interval, determining, based on the result of the comparing, whether the connected information processing apparatus is compatible with the first specification of the communications protocol, setting, in a case where it is determined that the connected information processing apparatus is compatible with the first specification, the first specification as the specification to be used to transmit the status information, and setting, in a case where it is determined that the connected information processing apparatus is not compatible with the first specification, the second specification of the communications protocol as the specification to be used to transmit the status information.

13. An image processing apparatus comprising:
a memory device that stores a set of instructions; and
at least one processor that executes the instructions to:
connect the image processing apparatus with a first information processing apparatus which is compatible with a first specification of a communications protocol and is not compatible with a second specification of said communications protocol and a second information processing apparatus which is compatible with the second specification;
input an instruction of selecting a specification from among a plurality of specifications including the first specification and the second specification, the selected specification being used for notifying an information processing apparatus connected with the image processing apparatus of a status of the image processing apparatus;
receive, from the connected information processing apparatus, a transmission request for status information indicating a status of the image processing apparatus; and
transmit, according to the specification selected by the input instruction, the status information in response to the transmission request,
wherein the image processing apparatus is compatible with the first specification and the second specification, and wherein the stored instructions further comprising instructions to:
store, in a storage unit,
a first interval information indicating first interval from a transmission of the status information indicating a normal state of the image processing apparatus until a reception of a next transmission request, and
a second interval information indicating second interval from a transmission of the status information indicating an error state of the image processing apparatus until a reception of a next transmission request; and
execute steps of:
comparing the length of the first interval and the second interval, determining, based on the result of the comparing, whether the connected information processing apparatus is compatible with the first specification of the communications protocol,
setting, in a case where it is determined that the connected information processing apparatus is compatible with the first specification, the first specification as the specification to be used to transmit the status information, and
setting, in a case where it is determined that the connected information processing apparatus is not compatible with the first specification, the second specification of the communications protocol as the specification to be used to transmit the status information.

14. An image processing apparatus, the image processing apparatus which is compatible with Host Resources MIB according to RFC 1514 and is compatible with Host Resources MIB according to RFC 2790, the image processing apparatus comprising:
a memory device that stores a set of instructions; and
at least one processor that executes the instructions to:
set, as a setting of the image processing apparatus set by a user, whether to use hrPrinterDetectedErrorState of Host Resources MIB according to RFC 2790 to notify an information processing apparatus connected with the image processing apparatus of a status of the image processing apparatus;
receive, from the connected information processing apparatus, a transmission request for status information indicating a status of the image processing apparatus;
transmit, in a case where using hrPrinterDetectedErrorState of Host Resources MIB according to RFC 2790 has been set, the status information of the image processing apparatus in accordance with hrPrinterDetectedErrorState of Host Resources MIB according to RFC 2790; and
transmit, in a case where using hrPrinterDetectedErrorState of Host Resources MIB according to RFC 2790 has not been set, the status information of the image processing apparatus in accordance with hrPrinterDetectedErrorState of Host Resources MIB according to RFC 1514,
wherein, whether to use, in information communication in accordance with SNMP version 1, hrPrinterDetectedErrorState of Host Resources MIB according to RFC 2790 can be set by the user, and, whether to use, in information communication in accordance with SNMP version 3, hrPrinterDetectedErrorState of Host Resources MIB according to RFC 2790 can be set by the user.

15. The image forming apparatus according to claim 14, wherein whether to use, in information communication using Get Request command in accordance with SNMP version 1, hrPrinterDetectedErrorState of Host Resources MIB according to RFC 2790 can be set by the user, and, whether to use, in information communication using Get Next Request command in accordance with SNMP version 1, hrPrinterDetectedErrorState of Host Resources MIB according to RFC 2790 can be set by the user.

16. The image forming apparatus according to claim 14, wherein whether to use, in information communication using Get Request command in accordance with SNMP version 3, hrPrinterDetectedErrorState of Host Resources MIB according to RFC 2790 can be set by the user, and, whether to use, in information communication using Get Next Request command in accordance with SNMP version 3, hrPrinterDetectedErrorState of Host Resources MIB according to RFC 2790 can be set by the user, and, whether to use, in information communication using Get Bulk Request command in accordance with SNMP version 3, hrPrinterDetectedErrorState of Host Resources MIB according to RFC 2790 can be set by the user.

* * * * *